(12) United States Patent
Kurita

(10) Patent No.: US 9,661,721 B2
(45) Date of Patent: May 23, 2017

(54) LIGHT SOURCE APPARATUS, METHOD FOR CONTROLLING LIGHT SOURCE APPARATUS, AND DISPLAY APPARATUS

(71) Applicant: CANON KABUSHIKI KAISHA, Tokyo (JP)

(72) Inventor: Masanao Kurita, Isehara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 186 days.

(21) Appl. No.: 13/970,437

(22) Filed: Aug. 19, 2013

(65) Prior Publication Data
US 2014/0055037 A1    Feb. 27, 2014

(30) Foreign Application Priority Data
Aug. 24, 2012    (JP) .................................. 2012-185538

(51) Int. Cl.
| | |
|---|---|
| H05B 37/02 | (2006.01) |
| F21V 7/00 | (2006.01) |
| G02F 1/1335 | (2006.01) |
| G02F 1/133 | (2006.01) |
| G09G 3/34 | (2006.01) |

(52) U.S. Cl.
CPC ........... H05B 37/0218 (2013.01); F21V 7/00 (2013.01); G02F 1/13318 (2013.01); G02F 1/133603 (2013.01); G02F 1/133606 (2013.01); G09G 3/3426 (2013.01); G09G 2320/0233 (2013.01); G09G 2320/043 (2013.01); G09G 2320/062 (2013.01); G09G 2360/14 (2013.01)

(58) Field of Classification Search
None
See application file for complete search history.

(56) References Cited

U.S. PATENT DOCUMENTS

| | | | |
|---|---|---|---|
| 7,638,754 B2 | 12/2009 | Morimoto et al. | |
| 2008/0238860 A1 | 10/2008 | Onodera | |
| 2009/0140656 A1* | 6/2009 | Kohashikawa et al. | 315/151 |
| 2010/0007600 A1 | 1/2010 | Deurenberg et al. | |

FOREIGN PATENT DOCUMENTS

| | | |
|---|---|---|
| CN | 1945405 A | 4/2007 |
| CN | 101558439 A | 10/2009 |
| JP | 2001-142409 A | 5/2001 |
| JP | 2007-148177 A | 6/2007 |
| JP | 2008-249780 A | 10/2008 |
| JP | 2011-027941 A | 2/2011 |

OTHER PUBLICATIONS

Chinese Office Action dated May 22, 2015 for counterpart Chinese Patent Application No. 201310376555.1.

* cited by examiner

*Primary Examiner* — Cassandra Cox
(74) *Attorney, Agent, or Firm* — Fitzpatrick, Cella, Harper & Scinto

(57) ABSTRACT

A light source apparatus according to the present invention, includes: a light source substrate on which one or more emission units are located; an optical sheet configured to reflect light from the emission unit; and a detection unit configured to detect reflected light reflected by the optical sheet, wherein the detection unit is located in a position where an amount of change in a detected value due to deflection of the optical sheet when one emission unit is turned ON is a predetermined value or less.

52 Claims, 33 Drawing Sheets

FIG. 4

| PROCESSING SEQUENCE | EMISSION UNIT | OPTICAL SENSOR FOR ADJUSTMENT |
|---|---|---|
| 1 | 111(1,1,1) | 113(1,2,1) |
| 2 | 111(1,1,2) | 113(1,2,2) |
| 3 | 111(1,1,3) | 113(1,2,3) |
| 4 | 111(1,1,4) | 113(1,2,4) |
| 5 | 111(1,1,5) | 113(1,2,1) |
| 6 | 111(1,1,6) | 113(1,2,2) |
| 7 | 111(1,1,7) | 113(1,2,3) |
| 8 | 111(1,1,8) | 113(1,2,4) |
| 9 | 111(1,2,1) | 113(1,1,1) |
| 10 | 111(1,2,2) | 113(1,1,2) |
| 11 | 111(1,2,3) | 113(1,1,3) |
| 12 | 111(1,2,4) | 113(1,1,4) |
| 13 | 111(1,2,5) | 113(1,1,1) |
| 14 | 111(1,2,6) | 113(1,1,2) |
| 15 | 111(1,2,7) | 113(1,1,3) |
| 16 | 111(1,2,8) | 113(1,1,4) |
| 17 | 111(2,1,1) | 113(2,2,1) |
| 18 | 111(2,1,2) | 113(2,2,2) |
| 19 | 111(2,1,3) | 113(2,2,3) |
| 20 | 111(2,1,4) | 113(2,2,4) |
| 21 | 111(2,1,5) | 113(2,2,1) |
| 22 | 111(2,1,6) | 113(2,2,2) |
| 23 | 111(2,1,7) | 113(2,2,3) |
| 24 | 111(2,1,8) | 113(2,2,4) |
| 25 | 111(2,2,1) | 113(2,1,1) |
| 26 | 111(2,2,2) | 113(2,1,2) |
| 27 | 111(2,2,3) | 113(2,1,3) |
| 28 | 111(2,2,4) | 113(2,1,4) |
| 29 | 111(2,2,5) | 113(2,1,1) |
| 30 | 111(2,2,6) | 113(2,1,2) |
| 31 | 111(2,2,7) | 113(2,1,3) |
| 32 | 111(2,2,8) | 113(2,1,4) |

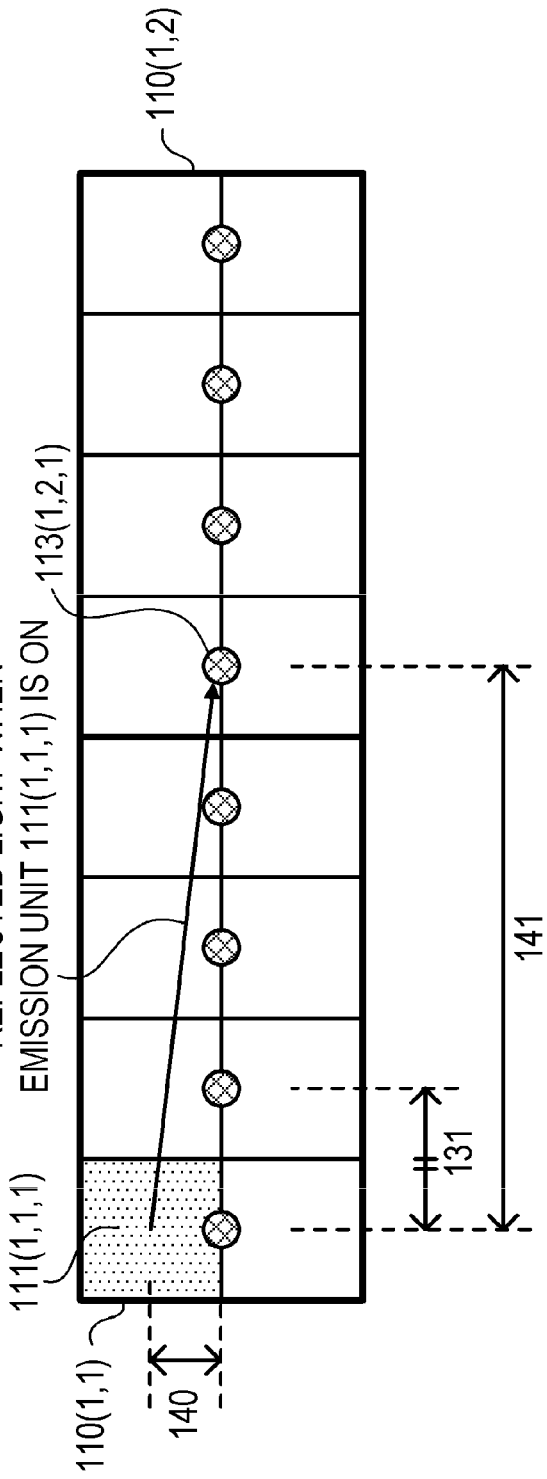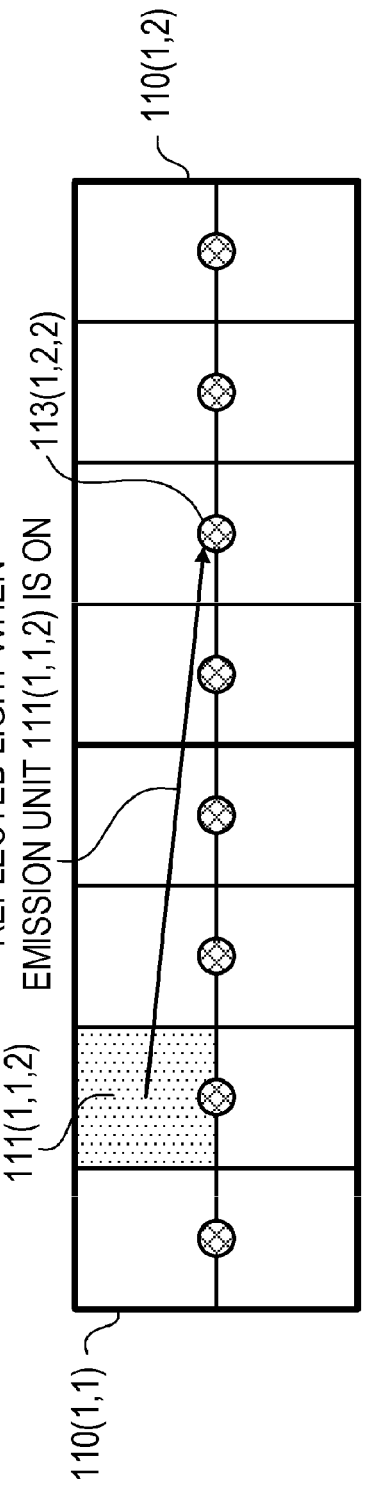

FIG. 11

| PROCESSING SEQUENCE | EMISSION UNIT | OPTICAL SENSOR FOR ADJUSTMENT | Rd |
|---|---|---|---|
| 1 | 111(1,1,1) | 113(1,2,2) | 5.02 |
| 2 | 111(1,1,2) | 113(1,2,3) | 5.02 |
| 3 | 111(1,1,3) | 113(1,2,4) | 5.02 |
| 4 | 111(1,1,4) | 113(2,2,4) | 4.72 |
| 5 | 111(1,1,5) | 113(1,2,2) | 5.02 |
| 6 | 111(1,1,6) | 113(1,2,2) | 4.03 |
| 7 | 111(1,1,7) | 113(1,2,3) | 4.03 |
| 8 | 111(1,1,8) | 113(1,2,4) | 4.03 |
| 9 | 111(1,2,1) | 113(2,1,1) | 4.72 |
| 10 | 111(1,2,2) | 113(1,1,1) | 5.02 |
| 11 | 111(1,2,3) | 113(1,1,2) | 5.02 |
| 12 | 111(1,2,4) | 113(1,1,3) | 5.02 |
| 13 | 111(1,2,5) | 113(1,1,1) | 4.03 |
| 14 | 111(1,2,6) | 113(1,1,2) | 4.03 |
| 15 | 111(1,2,7) | 113(1,1,3) | 4.03 |
| 16 | 111(1,2,8) | 113(1,1,3) | 5.02 |
| 17 | 111(2,1,1) | 113(2,2,2) | 5.02 |
| 18 | 111(2,1,2) | 113(2,2,2) | 4.03 |
| 19 | 111(2,1,3) | 113(2,2,3) | 4.03 |
| 20 | 111(2,1,4) | 113(2,2,4) | 4.03 |
| 21 | 111(2,1,5) | 113(2,2,2) | 5.02 |
| 22 | 111(2,1,6) | 113(2,2,3) | 5.02 |
| 23 | 111(2,1,7) | 113(2,2,4) | 5.02 |
| 24 | 111(2,1,8) | 113(1,2,4) | 4.72 |
| 25 | 111(2,2,1) | 113(2,1,1) | 4.03 |
| 26 | 111(2,2,2) | 113(2,1,2) | 4.03 |
| 27 | 111(2,2,3) | 113(2,1,3) | 4.03 |
| 28 | 111(2,2,4) | 113(2,1,3) | 5.02 |
| 29 | 111(2,2,5) | 113(1,1,1) | 4.72 |
| 30 | 111(2,2,6) | 113(2,1,1) | 5.02 |
| 31 | 111(2,2,7) | 113(2,1,2) | 5.02 |
| 32 | 111(2,2,8) | 113(2,1,3) | 5.02 |

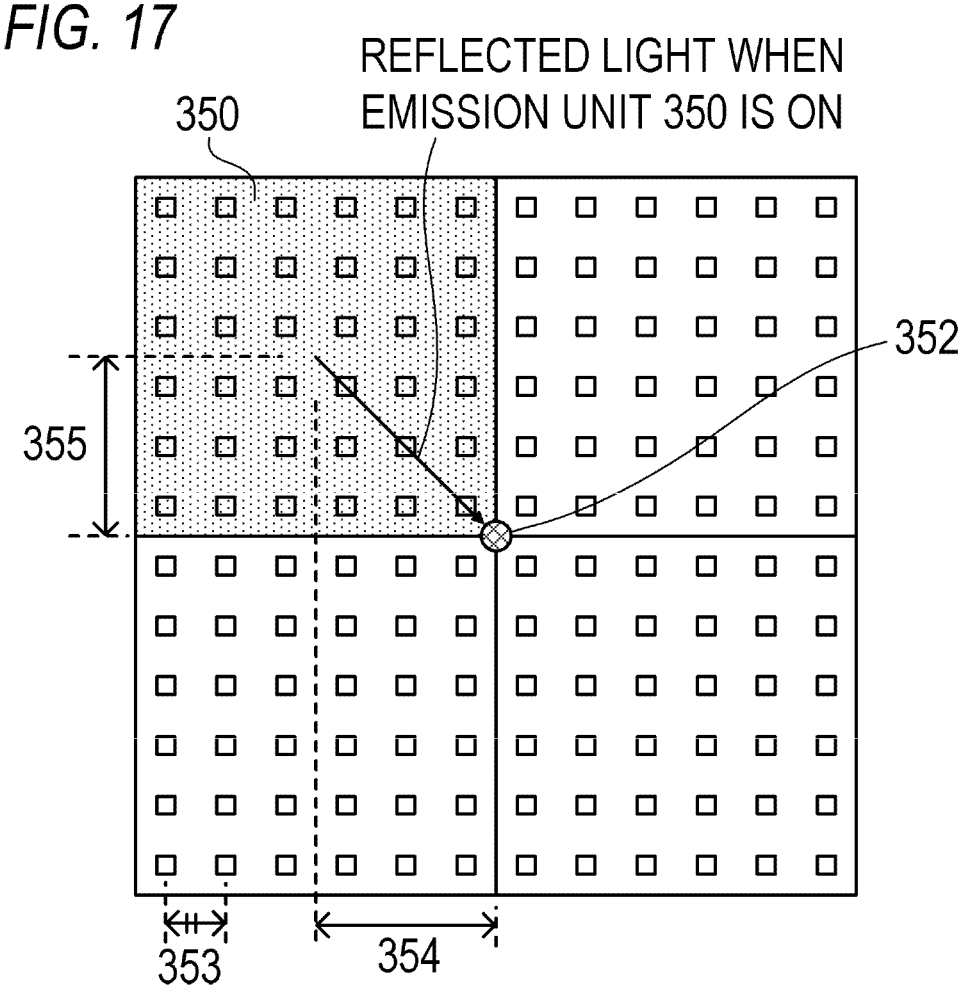

FIG. 20

| PROCESSING SEQUENCE | EMISSION UNIT | OPTICAL SENSOR FOR ADJUSTMENT | Rd |
|---|---|---|---|
| 1 | 111(1,1,1) | 113(1,2) | 5.10 |
| 2 | 111(1,1,2) | | 3.16 |
| 3 | 111(1,1,3) | | 5.10 |
| 4 | 111(1,1,4) | | 3.16 |
| 5 | 111(1,2,1) | 113(1,1) | 3.16 |
| 6 | 111(1,2,2) | | 5.10 |
| 7 | 111(1,2,3) | | 3.16 |
| 8 | 111(1,2,4) | | 5.10 |
| 9 | 111(1,3,1) | 113(1,4) | 5.10 |
| 10 | 111(1,3,2) | | 3.16 |
| 11 | 111(1,3,3) | | 5.10 |
| 12 | 111(1,3,4) | | 3.16 |
| 13 | 111(1,4,1) | 113(1,3) | 3.16 |
| 14 | 111(1,4,2) | | 5.10 |
| 15 | 111(1,4,3) | | 3.16 |
| 16 | 111(1,4,4) | | 5.10 |

| PROCESSING SEQUENCE | EMISSION UNIT | OPTICAL SENSOR FOR ADJUSTMENT | Rd |
|---|---|---|---|
| 1 | 111(1,1,1) | 113(1,1) | 1.41 |
| 2 | 111(1,1,2) | | 1.41 |
| 3 | 111(1,1,3) | | 1.41 |
| 4 | 111(1,1,4) | | 1.41 |
| 5 | 111(1,2,1) | 113(1,2) | 1.41 |
| 6 | 111(1,2,2) | | 1.41 |
| 7 | 111(1,2,3) | | 1.41 |
| 8 | 111(1,2,4) | | 1.41 |
| 9 | 111(1,3,1) | 113(1,3) | 1.41 |
| 10 | 111(1,3,2) | | 1.41 |
| 11 | 111(1,3,3) | | 1.41 |
| 12 | 111(1,3,4) | | 1.41 |
| 13 | 111(1,4,1) | 113(1,4) | 1.41 |
| 14 | 111(1,4,2) | | 1.41 |
| 15 | 111(1,4,3) | | 1.41 |
| 16 | 111(1,4,4) | | 1.41 |

| PROCESSING SEQUENCE | EMISSION UNIT | OPTICAL SENSOR FOR ADJUSTMENT | Rd |
|---|---|---|---|
| 1 | 111(1,1,1) | 113(2,1) | 5.10 |
| 2 | 111(1,1,2) | | 5.10 |
| 3 | 111(1,1,3) | | 3.16 |
| 4 | 111(1,1,4) | | 3.16 |
| 5 | 111(1,2,1) | 113(2,2) | 5.10 |
| 6 | 111(1,2,2) | | 5.10 |
| 7 | 111(1,2,3) | | 3.16 |
| 8 | 111(1,2,4) | | 3.16 |
| 9 | 111(1,3,1) | 113(2,3) | 5.10 |
| 10 | 111(1,3,2) | | 5.10 |
| 11 | 111(1,3,3) | | 3.16 |
| 12 | 111(1,3,4) | | 3.16 |
| 13 | 111(1,4,1) | 113(2,4) | 5.10 |
| 14 | 111(1,4,2) | | 5.10 |
| 15 | 111(1,4,3) | | 3.16 |
| 16 | 111(1,4,4) | | 3.16 |

FIG. 29

| PROCESSING SEQUENCE | EMISSION UNIT | OPTICAL SENSOR FOR ADJUSTMENT | Rd |
|---|---|---|---|
| 33 | 111(3,1,1) | 113(2,1) | 3.16 |
| 34 | 111(3,1,2) | | 3.16 |
| 35 | 111(3,1,3) | | 5.10 |
| 36 | 111(3,1,4) | | 5.10 |
| 37 | 111(3,2,1) | 113(2,2) | 3.16 |
| 38 | 111(3,2,2) | | 3.16 |
| 39 | 111(3,2,3) | | 5.10 |
| 40 | 111(3,2,4) | | 5.10 |
| 41 | 111(3,3,1) | 113(2,3) | 3.16 |
| 42 | 111(3,3,2) | | 3.16 |
| 43 | 111(3,3,3) | | 5.10 |
| 44 | 111(3,3,4) | | 5.10 |
| 45 | 111(3,4,1) | 113(2,4) | 3.16 |
| 46 | 111(3,4,2) | | 3.16 |
| 47 | 111(3,4,3) | | 5.10 |
| 48 | 111(3,4,4) | | 5.10 |

FIG. 30

FIG. 31A
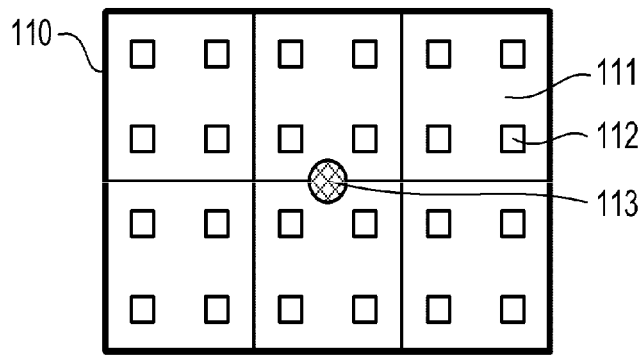
FIG. 31B
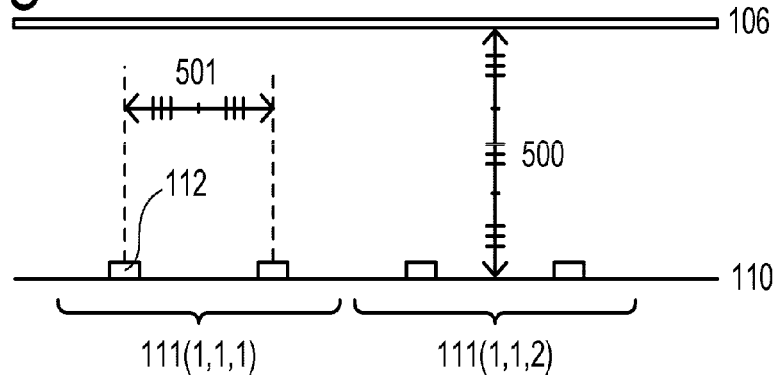
FIG. 31C

*FIG. 32*

| PROCESSING SEQUENCE | EMISSION UNIT | OPTICAL SENSOR FOR ADJUSTMENT | Rd |
|---|---|---|---|
| 1 | 111(1,1,1) | 113(1,2) | 5.37 |
| 2 | 111(1,1,2) | | 4.06 |
| 3 | 111(1,1,3) | | 2.75 |
| 4 | 111(1,1,4) | | 5.37 |
| 5 | 111(1,1,5) | | 4.06 |
| 6 | 111(1,1,6) | | 2.75 |
| 7 | 111(1,2,1) | 113(1,1) | 2.75 |
| 8 | 111(1,2,2) | | 4.06 |
| 9 | 111(1,2,3) | | 5.37 |
| 10 | 111(1,2,4) | | 2.75 |
| 11 | 111(1,2,5) | | 4.06 |
| 12 | 111(1,2,6) | | 5.37 |

| 111 (1,1,1) | 111 (1,1,2) | 111 (1,1,3) | 111 (1,2,1) | 111 (1,2,2) | 111 (1,2,3) |
| --- | --- | --- | --- | --- | --- |
| 111 (1,1,4) | 111 (1,1,5) | 111 (1,1,6) | 111 (1,2,4) | 111 (1,2,5) | 111 (1,2,6) |
| 111 (2,1,1) | 111 (2,1,2) | 111 (2,1,3) | 111 (2,2,1) | 111 (2,2,2) | 111 (2,2,3) |
| 111 (2,1,4) | 111 (2,1,5) | 111 (2,1,6) | 111 (2,2,4) | 111 (2,2,5) | 111 (2,2,6) |

LIGHT SOURCE APPARATUS, METHOD FOR CONTROLLING LIGHT SOURCE APPARATUS, AND DISPLAY APPARATUS

BACKGROUND OF THE INVENTION

Field of the Invention

The present invention relates to a light source apparatus, a method for controlling the light source apparatus, and a display apparatus.

Description of the Related Art

Some color image display apparatuses comprise a color liquid crystal panel having a color filter, and a light source apparatus (backlight apparatus) that irradiates white light onto the back face of the color liquid crystal panel.

Conventionally a fluorescent lamp, such as a cold cathode fluorescent lamp (CCFL) has primarily been used as a light source of a light source apparatus. Recently however light emitting diodes (LEDs) have begun to be used for a light source of a light source apparatus because of excellence in terms of power consumption, product life, color reproduction and environmental impact.

The light source apparatus that uses LEDs as the light source (LED backlight apparatus) normally has many LEDs. Japanese Patent Application Laid-Open No. 2001-142409 discloses an LED backlight apparatus having a plurality of emission units each of which having one or more LED(s). Japanese Patent Application Laid-Open No. 2001-142409 also discloses that the brightness is controlled for each emission unit. By dropping the emission brightness of the emission unit that irradiates light onto an area where dark images are displayed, out of a screen of a color image display apparatus, power consumption decreases and contrast of the image improves. This kind of brightness control for each emission unit according to the characteristic of the image is called "local dimming control".

One problem of a light source apparatus is the change of emission brightness of the light emitted from an emission unit. For example, the emission brightness changes by the change of emission characteristic of the light source depending on the temperature change, or by age deterioration of the light source. In the case of an emission apparatus having a plurality of emission units, dispersion of emission brightness (unevenness of brightness) is generated in a plurality of emission units because of the dispersion of the temperature values and degree of age deterioration among the plurality of emission units.

As a technique to decrease such changes of the emission brightness and unevenness of brightness, a technique of adjusting the emission brightness of the emission units using an optical sensor is known. In concrete terms, an optical sensor that detects reflected light, which is light emitted from the light source apparatus, reflected by an optical sheet (optical member) of the light source apparatus and returned to the emission unit side, is located, and the emission brightness of the emission unit is adjusted based on the detected value by the optical sensor. In an emission apparatus having a plurality of emission units, each emission unit is turned ON sequentially, and the reflected light is detected by an optical sensor for each emission unit, and the emission brightness is adjusted. This technique is disclosed in Japanese Patent Application Laid-Open No. 2011-27941.

SUMMARY OF THE INVENTION

However the brightness distribution on an emission side surface of the optical sheet, when one emission unit is turned ON, changes when the optical sheet deflects. In the prior art, this change is not taken into consideration, so the detected value of the optical sensor fluctuates considerably due to deflection of the optical sheet. As a result, the emission brightness of the emission unit cannot be adjusted very accurately if the prior art is used.

The present invention provides a light source apparatus, a method for controlling the light source apparatus, and a display apparatus, which allow acquiring the detected values that do not fluctuate much by deflection of the optical sheet as the detected values of reflected light from the optical sheet, and adjusting the emission brightness of the emission unit very accurately.

The present invention in its first aspect provides a light source apparatus, comprising:

a light source substrate on which one or more emission units are located;

an optical sheet configured to reflect light from the emission unit; and a detection unit configured to detect reflected light reflected by the optical sheet, wherein the detection unit is located in a position where an amount of change in a detected value due to deflection of the optical sheet when one emission unit is turned ON is a predetermined value or less.

The present invention in its second aspect provides a display apparatus comprising:

the light source apparatus; and a liquid crystal panel configured to receive from a back face side thereof light from the light source apparatus.

The present invention in its third aspect provides a light source apparatus, comprising:

a light source substrate on which one or more emission units are located;

an optical sheet configured to reflect light from the emission unit; and a detection unit configured to detect reflected light reflected by the optical sheet, wherein the detection unit is located so as to face a position on the surface of the optical sheet where the change amount of brightness on the surface due to deflection of the optical sheet when one emission unit is turned ON is a predetermined value or less.

The present invention in its fourth aspect provides a method for controlling a light source apparatus having a light source substrate on which a plurality of emission units are located, an optical sheet configured to reflect light from the emission unit, and a plurality of detection units configured to detect reflected light reflected by the optical sheet, the method comprising:

turning the plurality of emission units ON one by one according to a predetermined sequence; and detecting reflected light reflected by the optical sheet by using the detection unit that is located in a position where an absolute value of an amount of change in a detected value due to deflection of the optical sheet when one emission unit is turned ON in the turning is a predetermined value or less, out of the plurality of detection units.

According to this embodiment, detected values that do not fluctuate much by deflection of the optical sheet can be acquired as the detected values of reflected light from the optical sheet, and the emission brightness of the emission unit can be adjusted very accurately.

Further features of the present invention will become apparent from the following description of exemplary embodiments with reference to the attached drawings.

BRIEF DESCRIPTION OF THE DRAWINGS

FIG. 4 shows an example of a correspondence table according to Embodiment 1;

FIG. 5A and FIG. 5B are diagrams depicting an example of a positional relationship of an emission unit and an optical sensor for adjustment according to Embodiment 1;

FIG. 11 shows an example of a correspondence table according to Embodiment 1;

FIG. 17 is a diagram depicting an example of a positional relationship between an emission unit and an optical sensor for adjustment according to Embodiment 2;

FIG. 20 shows an example of a correspondence table according to Embodiment 3;

FIG. 22 is a diagram depicting an example of a positional relationship between an emission unit and an optical sensor for adjustment according to Embodiment 3;

FIG. 25 shows an example of a correspondence table according to Embodiment 3;

FIG. 27 is a diagram depicting an example of the light source apparatus according to Embodiment 3;

FIG. 28 shows an example of a correspondence table according to Embodiment 3;

FIG. 29 shows an example of a correspondence table according to Embodiment 3;

FIG. 30 is a diagram depicting an example of a positional relationship between an emission unit and an optical sensor for adjustment according to Embodiment 3;

FIG. 31A to FIG. 31C are diagrams depicting an example of a light source apparatus according to Embodiment 3;

FIG. 32 shows an example of a correspondence table according to Embodiment 3;

DESCRIPTION OF THE EMBODIMENTS

<Embodiment 1>

A light source apparatus and a control method thereof according to Embodiment 1 of the present invention will now be described. This embodiment shows a case when the light source apparatus is a backlight apparatus which is used for a color image display apparatus, but the light source apparatus is not limited to a backlight apparatus used for a display apparatus. The light source apparatus may be such a light apparatus as a street light and an indoor light.

Figure 1A:
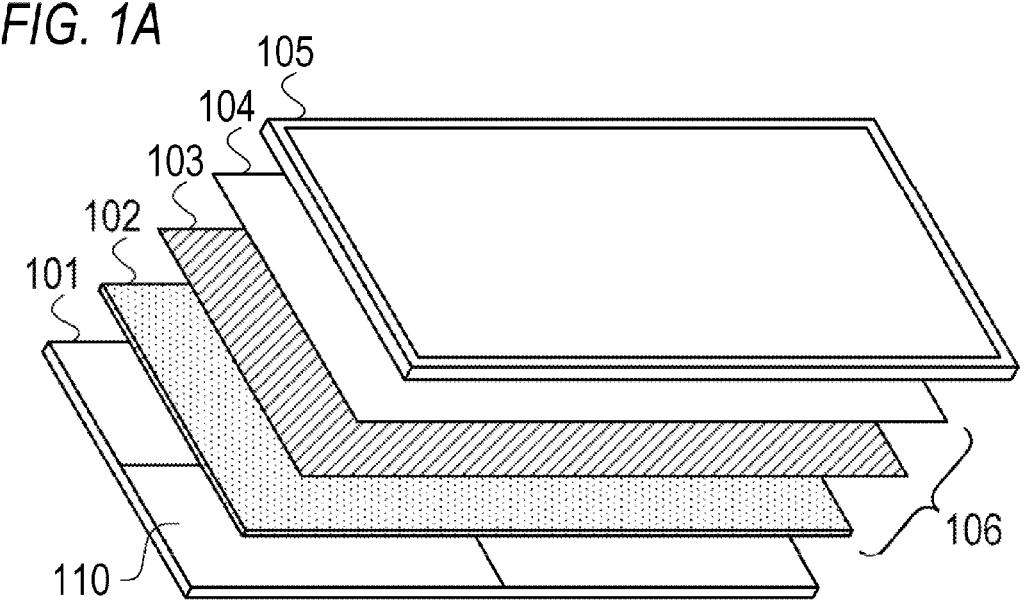
FIG. 1A and FIG. 1B are diagrams depicting an example of a light source apparatus according to Embodiment 1.

FIG. 1A is a schematic diagram depicting an example of a configuration of a color image display apparatus according to this embodiment. The color image display apparatus has a backlight apparatus and a color liquid crystal panel 105. The backlight apparatus includes a light source substrate 101, a diffuser plate 102, a light collecting sheet 103, and a reflection type polarizing film 104.

The light source substrate 101 emits light (white light) which is irradiated onto the back face of the color liquid crystal panel 105. A plurality of light sources are disposed on the light source substrate 101. For the light source, a light emitting diode (LED), a cold cathode tube and an organic EL element, for example, can be used.

The diffuser plate 102, the light collecting sheet 103, and the reflection type polarizing film 104 are disposed parallel with the light source substrate, and optically change the light emitted from the light source substrate 101 (the emission unit to be described).

In concrete terms, the diffuser plate 102 diffuses the light from the plurality of light sources (LED chips in this embodiment), so that the light source substrate 101 functions as a surface light source.

The light collecting sheet 103 collects the white light which is diffused by the diffuser plate 102 and enters at various incident angles toward the front face (color liquid crystal panel 105 side), so as to improve frontal brightness (brightness in a direction to the front face).

The reflection type polarizing film 104 improves the frontal brightness by efficiently polarizing entered white light.

The diffuser plate 102, the light collecting sheet 103 and the reflection type polarizing film 104 are layered and used. Hereafter these optical members are collectively called the "optical sheet 106". A member other than the above mentioned optical members may be included in the optical sheet 106, or one or more member (s) of the above mentioned optical members may not be included. The optical sheet 106 and the color liquid crystal panel 105 may be integrated.

Each member of the optical sheet 106 is formed by thin resin (several hundred μm to several mm thickness). Therefore the form of the optical sheet 106 tends to change (deflect) easily. For example, several mm of deflection is generated in the thickness direction. In concrete terms, the deflection depends on the size of the optical sheet, and deflection that is about 0.1 to 0.3% of the length of the long side of the optical sheet is generated (about 1 to 3 mm if the length of the long side is 1000 mm). The deflection is caused by various factors, such as thermal expansion, static electricity, age deterioration and gravity. For example, a maximum of 1 mm of deflection could be generated by thermal expansion. If the optical sheet is approximately parallel with the surface of the ground, then about 2 to 3 mm of deflection could be generated by gravity. Since the deflection is generated by various factors like this, it is difficult to accurately predict the deflection of the optical sheet 106, and prevent deflection itself.

The color liquid crystal panel 105 has a plurality of pixels constituted by R sub-pixels that transmit red light, G sub-pixels that transmit green light, and B sub-pixels that transmit blue light, and displays a color image by controlling the brightness of the irradiated white light for each sub-pixel.

A backlight apparatus having the above described configuration (configuration shown in FIG. 1A) is normally called the "direct-type backlight apparatus".

Figure 1B:
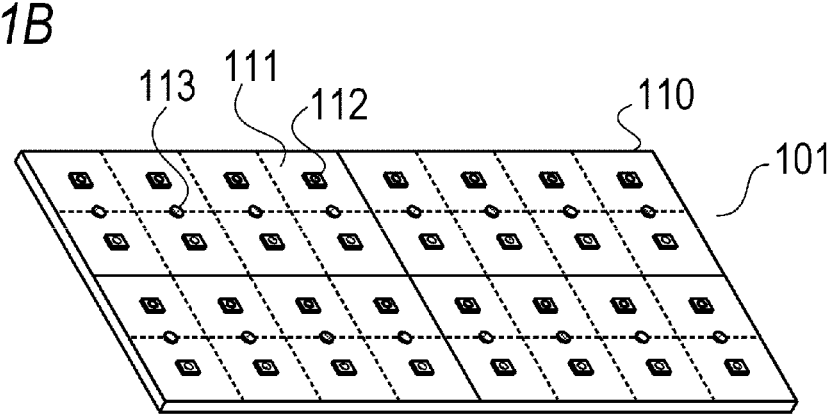

FIG. 1B is a schematic diagram depicting an example of the configuration of the light source substrate 101.

The light source substrate 101 has a plurality of emission units.

In the example in FIG. 1B, the light source substrate 101 has a total of 4 LED substrates 110 (2 rows×2 columns) which are disposed in a matrix. In this embodiment, the light source substrate 101 has a plurality of LED substrates, but the light source substrate 101 may have 1 LED substrate. For example, the 4 LED substrates in FIG. 1B may be 1 LED substrate.

Each LED substrate 110 has a total of 8 emission units 111 (2 rows×4 columns). In other words, the light source substrate 101 has a total of 32 emission units 111 (4 rows×8 columns).

Each emission unit 111 has one light source (LED chip 112), and the emission brightness of each emission unit 111 can be individually controlled. For the LED chip 112, a white LED that emits white light, for example, can be used. For the LED chip 112, a chip that emits white light using a plurality of LEDs of which emitted light color is different from one another (e.g. a red LED which emits red light, a green LED which emits green light, and a blue LED which emits blue light), may be used.

Optical sensors 113 (detection units) that detect light and output the detected values are disposed on the LED substrate 110. A part of the light from the emission unit 111 is reflected by the optical sheet and returned to the emission unit side. The optical sensor 113 detects reflected light which is reflected by the optical sheet 106 and returned to the emission unit side. The emission brightness of the emission unit 111 can be estimated based on the brightness of the reflected light. In this embodiment, a plurality of optical sensors are disposed at different positions. In the case of FIG. 1B, 4 optical sensors 113 are disposed on one LED substrate 110. In concrete terms, an optical sensor 113 is disposed between 2 emission units 111 which are arranged in the row direction of the LED substrate 110. For the optical sensor 113, a sensor which outputs brightness as the detected value can be used, such as a photodiode and a phototransistor. A color sensor that outputs a change of color, instead of brightness, may be used as the optical sensor 113.

Figure 2A:
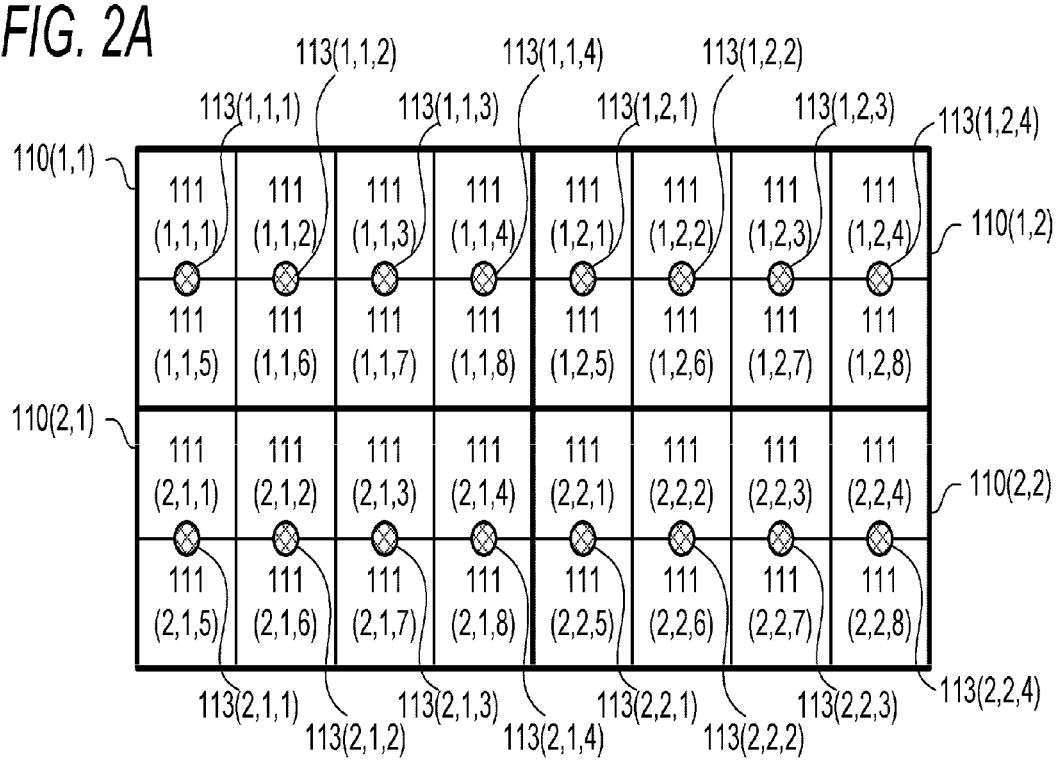
FIG. 2A and FIG. 2B are diagrams depicting an example of the light source apparatus according to Embodiment 1.

FIG. 2A is a schematic diagram depicting an example of an arrangement of the LED substrates 110, the emission units 111 and the optical sensors 113 when viewed from the front direction (color liquid crystal panel 105 side). The LED substrate 110 (1, 2) adjoins at the right of the LED substrate 110 (1, 1) which is disposed on the upper left corner, and the LED substrate 110 (2, 1) adjoins under the LED substrate 110 (1, 1). The LED substrate 110 (2, 2) adjoins on the right of the LED substrate 110 (2, 1).

The LED substrate 110 (X, Y) (X=1 or 2; Y=1 or 2) has 8 emission units 111 (X, Y, Z1) (Z1=1 to 8). For example, the LED substrate 110 (1, 1) has the emission unit 111 (1,1, 1), the emission unit 111 (1, 1, 2), the emission unit 111 (1, 1, 3), the emission unit 111 (1, 1, 4), the emission unit 111 (1, 1, 5), the emission unit 111 (1, 1, 6), the emission unit 111 (1, 1, 7) and the emission unit 111 (1, 1, 8). Z1 is a value that indicates a position of the emission unit 111. Each position Z1 of the 4 emission units in the first row of the 8 emission units 111 (X, Y, Z1) are 1, 2, 3 and 4 sequentially from the left, and positions Z1 of the 4 emission units in the second row are 5, 6, 7 and 8 sequentially from the left.

The 4 optical sensors 113 (X, Y Z2) (Z2=1 to 4) are disposed on the LED substrate 110 (X, Y). For example, the optical sensor 113 (1, 1, 1), the optical sensor 113 (1, 1, 2), the optical sensor 113 (1, 1, 3) and the optical sensor 113 (1, 1, 4) are disposed on the LED substrate 110 (1, 1). Z2 is a value that indicates a position of the optical sensor 113, and is 1, 2, 3 and 4 sequentially from the left.

Figure 2B:
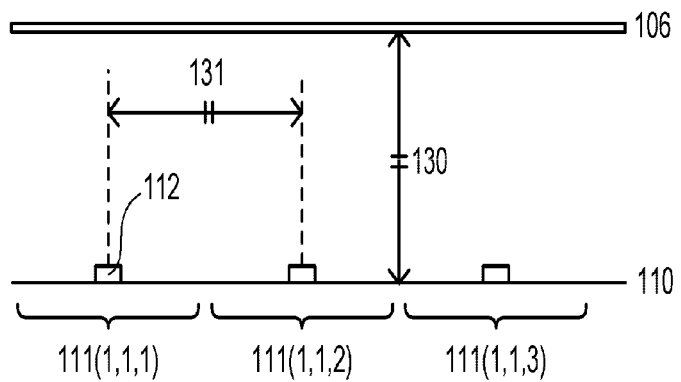

FIG. 2B is a cross-sectional view (plane intersects vertical to the screen) depicting an example of an arrangement of the LED substrate 110 and the optical sheet 106.

One LED chip 112 is disposed in each emission unit 111 of the LED substrate 110. Each LED chip 112 is disposed at equal intervals. The interval between the LED chips 112 is called the "LED pitch 131". The LED substrate 110 is disposed parallel with the optical sheet 106. The distance between the LED substrate 110 (emission unit 111) and the optical sheet 106 is called the "diffusion distance 130". In a backlight apparatus using an LED chip 112 having general directivity, the brightness unevenness after the light transmits through the optical sheet 106 can be sufficiently decreased by disposing each member such that the diffusion distance 130 becomes the same as the LED pitch 131 or longer than the LED pitch 131. In this embodiment, it is assumed that the LED pitch 131 is the same as the diffusion distance 130.

Figure 3:
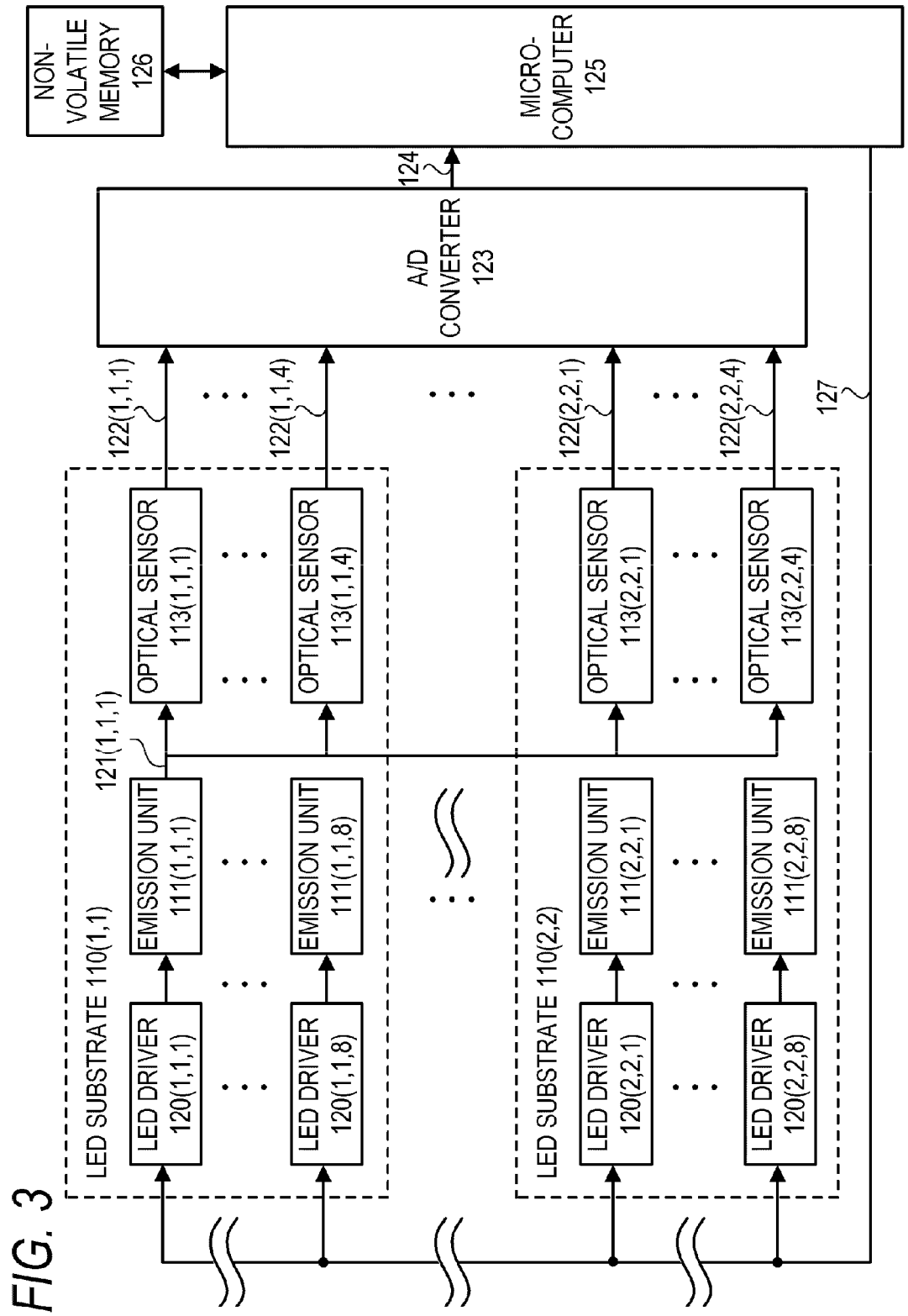
FIG. 3 is a block diagram depicting an example of the light source apparatus according to Embodiment 1.

FIG. 3 is a block diagram depicting an example of a configuration of the backlight apparatus.

Since the 4 LED substrates 110 have a same configuration, the LED substrate 110 (1, 1) will be described as an example. The LED substrate 110 (1, 1) has the emission units 111 (1, 1, 1) to 111 (1, 1, 8). The emission units 111 (1, 1, 1) to 111 (1, 1, 8) are driven by the LED drivers 120 (1, 1, 1) to 120 (1, 1, 8) respectively.

In this embodiment, emission brightness adjustment processing to decrease brightness unevenness, which is generated due to the dispersion of temperature and age deterioration among the emission units 111, is performed periodically or at a predetermined timing. All the emission units 111 are turned ON during normal operation, but in the emission brightness adjustment processing, the plurality of emission units 111 are turned ON one by one according to a predetermined sequence, and reflected light is detected using the optical sensor 113. The emission brightness of the emission unit 111 is adjusted based on the detected value of the optical sensor 113.

FIG. 3 shows a lighting state when acquiring a detected value to be used for adjusting the emission brightness of the emission unit 111 (1, 1, 1). In FIG. 3, the emission unit 111 (1, 1, 1) is ON and the other emission units 111 are OFF. Most of the light 121 (1, 1, 1) emitted from the emission unit 111 (1, 1, 1) enters the color liquid crystal panel 105 (not illustrated in FIG. 3). But part of the light 121 (1, 1, 1) returns from the optical sheet 106 (not illustrated in FIG. 3) to the emission unit side, and enters each optical sensor 113. According to the brightness of the detected light, each optical sensor 113 outputs an analog value 122 (detected value) to indicate this brightness. Out of the analog value (s) 122 outputted by each optical sensor 113, an A/D converter 123 selects an analog value 122 (1, 2, 1) outputted by the optical sensor 113 (1, 2, 1) which is assigned to the emission unit 111 (1, 1, 1) in advance. Then the A/D converter 123 converts the selected analog value into a digital value, and outputs the digital value 124 to a microcomputer 125. The optical sensor 113 which is assigned to the emission unit 111 in advance is used for adjusting the emission brightness of the emission unit 111. Hence this optical sensor is hereafter called the "optical sensor for adjustment".

The brightness distribution on the emission side surface of the optical sheet when this emission unit is turned ON is changed by deflection of the optical sheet (the emission unit side surface of the optical sheet is defined as the back face). In this embodiment, the optical sensor 113 (1, 2, 1) is used to adjust the emission brightness of the emission unit 111 (1, 1, 1), therefore detected values which do not fluctuate very much by the deflection of the optical sheet can be acquired. As a result, the emission brightness of the emission unit can be adjusted very accurately. Details on the reason why this effect can be acquired will be described later.

The same processing is also performed for the other emission units 111. In other words, each optical sensor 113 detects the reflected light, in a state where only the processing target emission unit 111 is ON. In the A/D converter 123 related to a brightness adjustment target, the analog value 122 of the optical sensor 113, which is assigned in advance to the emission brightness adjustment target emission unit 111, is converted into a digital value 124, and the digital value 124 is outputted to the microcomputer 125. This means that a total of 32 detected values (detected values of the optical sensors: digital values 124) are outputted from the A/D converter 123 to the microcomputer 125.

The microcomputer 125 adjusts the emission brightness of the emission unit 111 based on the detected value (to be more specific, the digital value 124) of the optical sensor 113. In this embodiment, for each emission unit, the microcomputer 125 adjusts the emission brightness for the emission unit based on the detected value of the optical sensor for adjustment. In concrete terms, the microcomputer 125 holds a brightness target value (target value of the detected value) of each emission unit 111, which is determined in an inspection when the color image display apparatus is manufactured, for example, in a nonvolatile memory 126. For each emission unit 111, the microcomputer 125 compares the detected value of the optical sensor 113 assigned to the emission unit 111 and the target value. According to the comparison result, the microcomputer 125 adjusts the emission brightness for each emission unit 111 so that the detected value matches with the target value. The emission brightness is adjusted by adjusting an LED driver control signal 127 which is outputted from the microcomputer 125 to the LED driver 120, for example. The LED driver 120 drives the emission unit 111 according to the LED driver control signal. The LED driver control signal indicates a pulse width of a pulse signal (pulse signal of current or voltage) that is applied to the emission unit 111, for example. In this case, the emission brightness of the emission unit 111 is PWM-controlled by adjusting the LED driver control signal. The LED driver control signal is not limited to this. For example, the LED driver control signal may be a wave height value of a pulse signal that is applied to the emission unit 111, or may be both the pulse width and the wave height values. By adjusting the emission brightness of each emission unit 111 so that the detected value becomes the target value, the brightness unevenness in the entire backlight apparatus can be suppressed.

FIG. 4 is a correspondence table showing an example of the correspondence relationship of a processing sequence, an emission unit 111 and an optical sensor for adjustment, determined for a plurality of emission units 111. The above mentioned processing (acquiring a detected value and outputting the value to the microcomputer 125) is executed 32 times, which is the same number as the number of emission units 111.

In the first processing, the emission unit 111 (1, 1, 1) is turned ON and the other emission units 111 are turned OFF. Then the optical sensor 113 (1, 2, 1) is selected as the optical sensor for adjustment, and the detected value by the optical sensor 113 (1, 2, 1) is outputted to the microcomputer 125.

FIG. 5A is a schematic diagram depicting a positional relationship of the emission unit 111 (1, 1, 1) and the optical sensor 113 (1, 2, 1) when viewed from the front direction (color liquid crystal panel 105 side). According to this embodiment, to adjust the emission brightness of the emission unit 111 (1, 1, 1), the optical sensor 113 (1, 2, 1) which is located relatively far from the emission unit 111 (1, 1, 1) is used, instead of the optical sensor 113 closest to the emission unit 111 (1, 1, 1). Since the vertical distance 140 is 0.5 times the LED pitch 131, and the horizontal distance 141 is 4 times the LED pitch 131, the distance between the emission center of the emission unit 111 (1, 1, 1) and the optical sensor 113 (1, 2, 1) is 4.03 times the LED pitch 131 based on the Pythagorean Theorem. In this embodiment, it is assumed that the LED pitch 131 is the same as the diffusion distance 130, so the distance between the emission center of the emission unit 111 (1, 1, 1) and the optical sensor 113 (1, 2, 1) is 4.03 times the diffusion distance 130.

As FIG. 4 shows, in the second processing, the emission unit 111 (1, 1, 2) is turned ON and the other emission units 111 are turned OFF. Then the optical sensor 113 (1, 2, 2) is selected as the optical sensor for adjustment, and the detected value by the optical sensor 113 (1, 2, 2) is outputted to the microcomputer 125.

FIG. 5B is a schematic diagram depicting a positional relationship of the emission unit 111 (1, 1, 2) and the optical sensor 113 (1, 2, 2) when viewed from the front direction (color liquid crystal panel 105 side). Just like the first processing, the distance between the emission center of the emission unit 111 (1, 1, 2) and the optical sensor 113 (1, 2, 2) is 4.03 times the diffusion distance 130.

The third and later processing operations shown in the correspondence table in FIG. 4 are executed in the same manner. In the third and later processing operations as well, the distance between the processing target emission unit 111 and the optical sensor for adjustment is 4.03 times the diffusion distance 130.

In the following description, the ratio of the distance between the emission center of the emission unit 111 and the optical sensor 113 with respect to the diffusion distance 130 is denoted by Rd.

Now the reason why detected values do not fluctuate much by the deflection of the optical sheet 106, if the optical sensor 113 located at a position to satisfy Rd=4.03 is used as the optical sensor for adjustment, will be described.

Figure 6A:
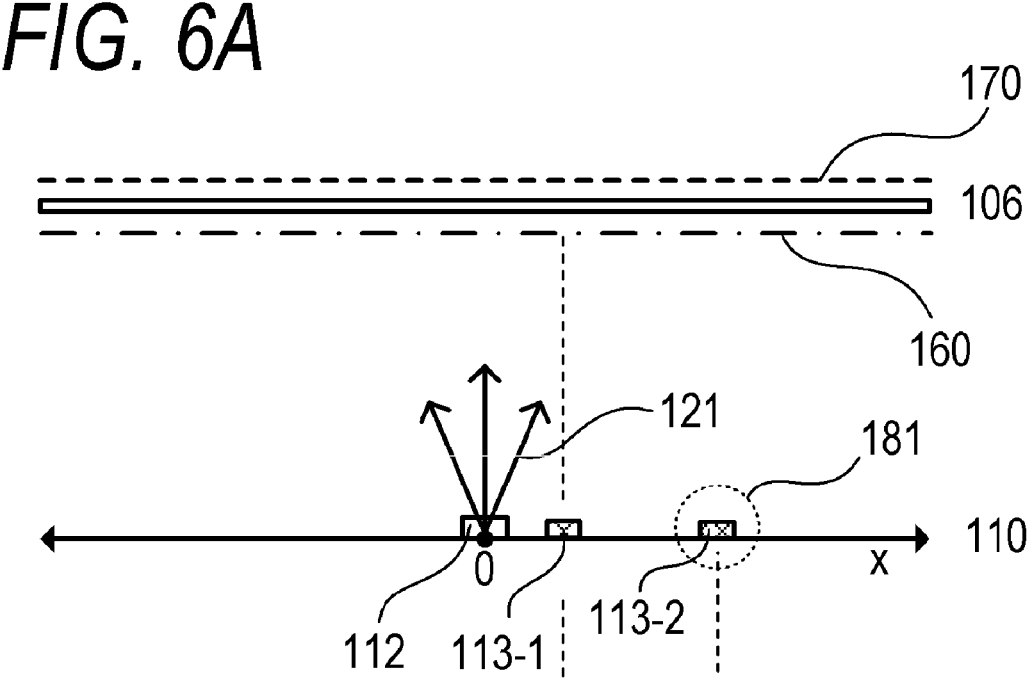
FIG. 6A and FIG. 6B are diagrams depicting a configuration of the light source apparatus according to Embodiment 1 and the change of brightness due to deflection.

FIG. 6A is a schematic diagram depicting an example of a positional relationship of the LED chip 112, the optical sensor 113, the LED substrate 110 and the optical sheet 106. The LED substrate 110 is disposed parallel with the optical sheet 106. The LED chip 112 is disposed on the LED substrate 110 such that the emission surface faces the optical sheet 106 side (direction that is perpendicular to the light source substrate, toward the optical sheet side). If the LED chip 112 turns ON, the light 121 from the LED chip 112 spreads toward the optical sheet 106. Light that is emitted from an LED normally has directivity of which intensity distribution has substantially a Lambertian distribution, where the intensity is highest in the direction perpendicular to the emission surface.

Figure 7:
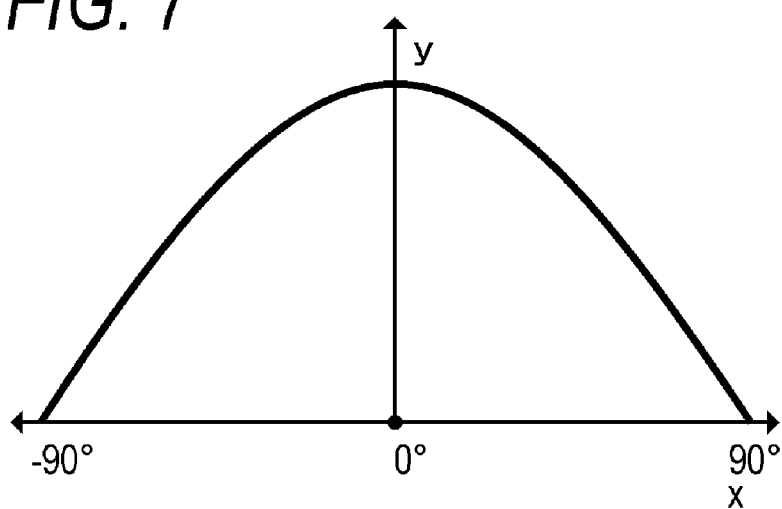
FIG. 7 is a graph depicting an example of the emission brightness distribution of the emission unit.

FIG. 7 is a graph depicting an example of a relationship between an angle θ from the direction perpendicular to the emission surface of the LED chip 112, and the intensity of light emitted from the LED chip 112 (emission intensity). FIG. 7 is a case when the emission intensity distribution of the LED chip 112 has Lambertian distribution. The y axis in FIG. 7 indicates the emission intensity, and the x axis indicates angle θ. As FIG. 7 shows, in the case of Lambertian distribution, the emission intensity=cos θ is established, where the emission intensity is highest when angle θ=0°, and the emission intensity becomes 0 when angle θ=±90°.

Figure 6B:
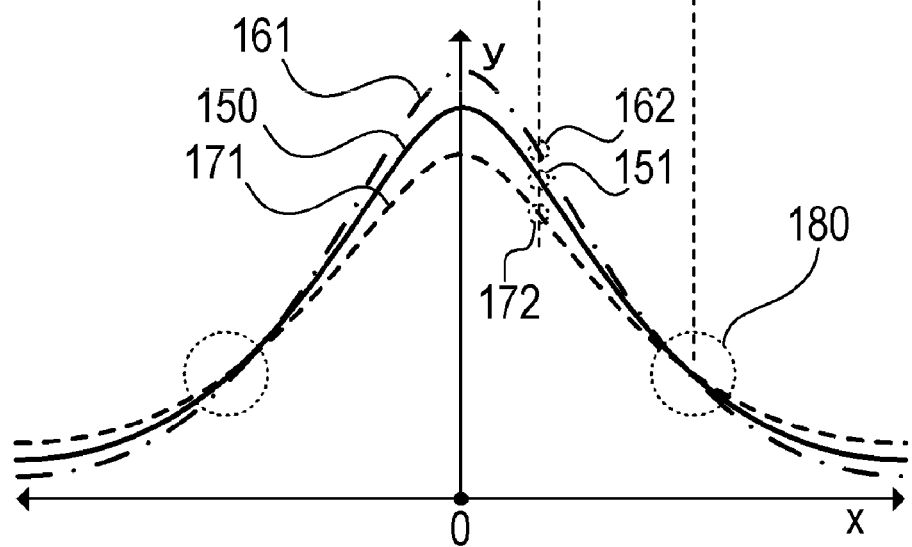

FIG. 6B is a graph showing an example of the brightness distribution on the back face of the optical sheet 106 when only one LED chip 112 (only one emission unit) is turned ON. In FIG. 6B, the y axis indicates the brightness, and the x axis indicates a position on the optical sheet 106. In concrete terms, the x axis indicates a distance from the position facing the LED chip 112. The brightness on the back face of the optical sheet 106 is determined by the total of the light that directly enters from the LED chip 112 (direct incident component) and the light that enters after repeating reflect ion between the optical sheet 106 and the LED substrate 110 (indirect incident component). The brightness distribution on the back face of the optical sheet 106 is at maximum when the position is x=0 (position directly above the LED chip 112), and the brightness decreases as the position becomes more distant from the position x=0, drawing the curve 150. The curve 150 is the brightness distribution when the optical sheet 106 is not deflected.

Here as FIG. 6A shows, it is assumed that the optical sensor 113-1 is disposed on the LED substrate 110 so that the detection surface of the optical sensor 113-1 faces the optical sheet 106 side (direction that is perpendicular to the light source substrate toward the optical sheet side). In this case, the optical sensor 113-1 detects the brightness that corresponds to the brightness 151 at the position facing the optical sensor 113-1 in the brightness distribution in FIG. 6B. In order to optimize the S/N ratio in the detected value of the optical sensor, it is necessary to dispose the optical sensor as close as possible to the LED chip 112, so that the most light quantity is received, and the prior art is designed based on this concept.

Figure 8:
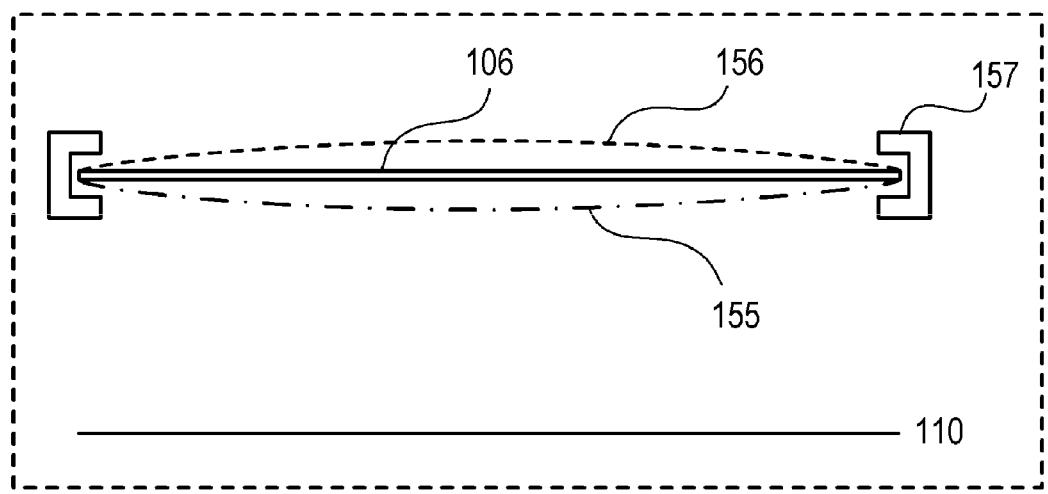
FIG. 8 is a diagram depicting an example of deflection of the optical sheet.

FIG. 8 is a cross-sectional view depicting an example of deflection that could be generated in the optical sheet 106. The periphery portion of the optical sheet 106 is secured by the optical sheet securing member 157. However because of such a causal factor as thermal expansion, static electricity, age deterioration and gravity, deflection is generated in the optical sheet 106, of which deflection amount is more as the deflection area is closer to the center potion, and is less as the area is closer to the periphery portion. The deflection is generated in the minus direction by which the entire optical sheet 106 deflects toward the LED substrate 110 (deflection 155), or in the plus direction by which the entire optical sheet 106 deflects away from the LED substrate 110 (deflection 156). In addition to this deflection, local deflection and waviness could also be generated, but normally either the deflection in the minus direction 155 or the deflection in the plus direction 156 is dominant.

The dashed line 160 in FIG. 6A indicates a position of the optical sheet 106 deflected in the minus direction. When the optical sheet 106 deflects in the minus direction, the optical sheet 106 moves closer to the LED substrate 110 while maintaining a parallel relationship with the LED substrate 110. As the cross-sectional view in FIG. 8 shows, the deflection is greater as the area is closer to the center potion of the optical sheet 106, but in a microscopic perspective limited to the periphery of the LED chip 112, it still can be regarded that the parallel relationship between the optical sheet 106 and the LED substrate 110 is maintained.

The dashed line 161 in FIG. 6B indicates the brightness distribution on the back face of the optical sheet 106 which is deflected in the minus direction. In the curve 161, the brightness becomes higher than that of the curve 150 at around a position facing the LED chip 112 (around x=0), and the brightness becomes lower than that of the curve 150 at a position distant from the position facing the LED chip 112. This is because the spread of light from the LED chip 112 (spread of light until reaching the optical sheet 106) is suppressed by the optical sheet 106 approaching the LED chip 112. If the spread of light from the LED chip 112 is suppressed, light 121 concentrates on the position facing the LED chip 112, and the light 121 does not fully reach positions distant from the position facing the LED chip 112.

If the optical sheet 106 is at the position indicated by the dashed line 160, the optical sensor 113-1 detects brightness that corresponds to the brightness 162 at the position facing the optical sensor 113-1 in the brightness distribution 161 in FIG. 6B. This brightness 162 becomes higher than the brightness 151, which is brightness when the optical sheet 106 is not deflected, at a position close to the LED chip 112 (around x=0), and becomes lower than the brightness 151 at a position distant from the LED chip 112. In other words, if the brightness distribution on the back face of the optical sheet is changed by deflection of the optical sheet, the change amount of the detected value of the optical sensor due to deflection of the optical sheet changes according to the distance between the emission center of the emission unit and the optical sensor. Since it is the change of brightness due to temperature and age deterioration that must be detected by the optical sensor, the change of brightness generated by the deflection of the optical sheet 106 becomes a detection error.

The broken line 170 in FIG. 6A indicates the position of the optical sheet 106 which is deflected in the plus direction. When the optical sheet 106 deflects in the plus direction, the optical sheet 106 moves away from the LED substrate 110 while maintaining the parallel relationship with the LED substrate 110.

The broken line 171 in FIG. 6B indicates the brightness distribution on the back face of the optical sheet 106 which is deflected in the plus direction. In the curve 171, the brightness becomes lower than that of the curve 150 at around a position facing the LED 112 (around x=0), and the brightness becomes higher than that of the curve 150 at a position distant from the position facing the LED chip 112. This is because the light from the LED chip 112 spreads more as the optical sheet 106 moves away from the LED chip 112. If the light from the LED chip 112 spreads more, the light 121 does not easily concentrate on the position facing the LED chip 112, and the light 121 can more easily reach the positions distant from the positions facing the LED chip 112.

If the optical sheet 106 is at the position indicated by the broken line 170, the optical sensor 113-1 detects brightness that corresponds to the brightness 172 at the position facing the optical sensor 113-1 in the brightness distribution 171 in FIG. 6B. This brightness 172 becomes lower than the brightness 151, which is brightness when the optical sheet 106 is not deflected, at a position close to the LED chip 112 (around x=0), and becomes higher than the brightness 151 at a position distant from the LED chip 112. In other words, this change of brightness becomes a detection error, just like the case of the optical sheet 106 deflected in the minus direction.

As FIG. 6B shows, there is a position 180 where the curve 150, the curve 161 and the curve 171 match (position where brightness changes due to deflection is zero: zero cross point of the curve). Therefore an optical sensor 113-2, which is disposed to face the area near the zero cross point position on the back face of the optical sheet (position on the back face where the absolute value of the change amount of the brightness due to the deflection of the optical sheet is a predetermined value or less), is used as the optical sensor for adjustment. In other words, the optical sensor 113-2, disposed at a position where the absolute value of the change amount of the detected value due to the deflection of the optical sheet is a predetermined value or less, is used as the optical sensor for adjustment. In concrete terms, according to this embodiment, an optical sensor is assigned to each emission unit out of a plurality of optical sensors (FIG. 4), and is disposed at a position where the absolute value of the change amount of the detected value due to deflection of the optical sheet when only this emission unit is turned ON is a predetermined value or less. When the emission brightness of an emission unit is adjusted, the optical sensor assigned to this emission unit is used out of the plurality of optical sensors. Thereby the detection error (change of detected value) of the optical sensor due to deflection of the optical sheet 106 can be decreased.

The position where the optical sensor 113 is disposed is not limited to the position on the LED substrate 110. For example, the optical sensor 113 may be disposed inside a hole formed on the LED substrate 110, or the optical sensor 113 may be disposed at a position distant from the LED substrate 110.

DICOM part 14 is a standard on the display performance of a medical image display apparatus for which high precision is demanded. According to DICOM part 14, it is required that the detected value of a photometer to calibrate the display brightness is within 3% of the absolute brightness (see Digital Imaging and Communications in Medicine (DICOM) Part 14: Grayscale Standard Display Function). If a photometer (that is an actual sensor) that satisfies this precision is used, an error of display brightness can be suppressed to a degree that it is not recognized by the user. Therefore it is preferable that the optical sensor for adjustment is disposed at a position on the back face of the optical sheet, where the ratio of brightness when the optical sheet is deflected with respect to the brightness when the optical sheet is not deflected is 97% or more, and 103% or less. By using the optical sensor for adjustment disposed at such a position, detected values to be acquired fluctuate less due to the deflection of the optical sheet, and as a result, the emission brightness of the emission unit can be adjusted very accurately.

Now the relationship between the change amount of the brightness on the back face of the optical sheet 106 and Rd (ratio of distance between the emission center of the emission unit 111 and the optical sensor 113 with respect to the diffusion distance 130) will be described.

Figure 9:
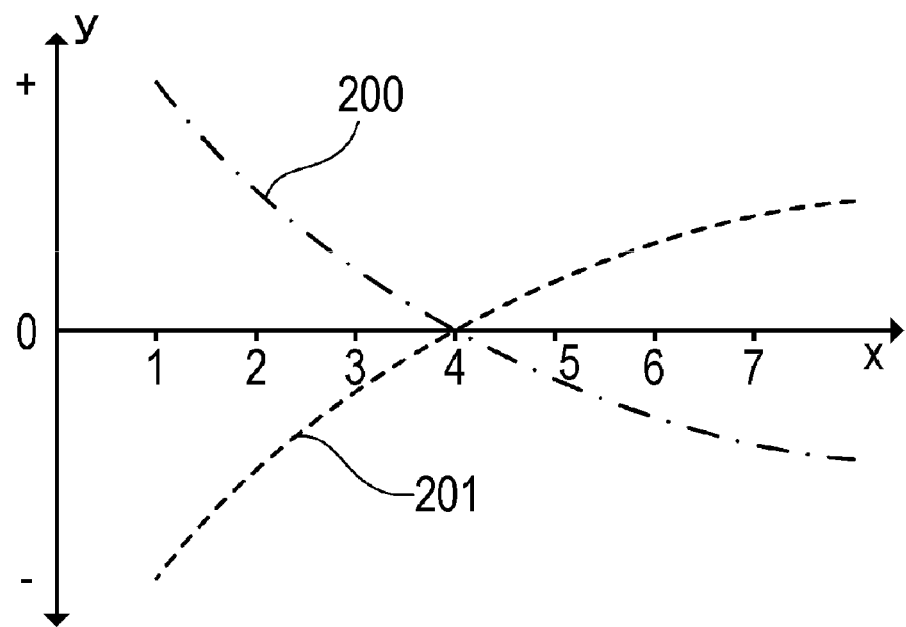
FIG. 9 is a graph depicting an example of a relationship between the change amount of brightness due to deflection of the optical sheet and Rd.

FIG. 9 is an example when the emission intensity distribution of the emission unit (LED chip) has substantially a Lambertian distribution (the emission intensity conforms to cos θ). FIG. 9 shows a case when the LED pitch 131 and the diffusion distance 130 are the same. The x axis in FIG. 9 indicates Rd, and the y axis indicates the change amount of the brightness (brightness on the back face of the optical sheet) generated by deflection of the optical sheet. The curve 200 indicates the change amount of the brightness when the optical sheet 106 is deflected in the minus direction. And the curve 201 shows the change amount of the brightness when the optical sheet 106 is deflected in the plus direction.

As FIG. 9 shows, the change amount of the brightness due to deflection of the optical sheet increases as the position becomes closer to the position facing the LED chip 112 (position on the optical sheet facing the position of Rd=0). The position on the optical sheet facing the position where Rd is approximately 4 is the zero cross point, and if Rd is greater than this, the change amount of the brightness also increases.

In the case when the detection surface of the optical sensor 113 faces the optical sheet 106 side (direction perpendicular to the light source substrate, toward the optical sheet side), the y axis indicates the detection error of the optical sensor 113.

Therefore if the emission intensity distribution has substantially a Lambertian distribution, it is preferable that the optical sensor for adjustment, that is used for adjusting the emission brightness of the emission unit, is disposed at a position distant from the emission center of the emission unit by a distance approximately 4 times the distance between the emission unit and the optical sheet. Thereby detected values to be acquired fluctuate less by the deflection of the optical sheet.

Because of the above reason, the distance between the processing target emission unit 111 and the optical sensor for adjustment is 4.03 times the diffusion distance 130 in this embodiment. As a result, detected values to be acquired fluctuate less by the deflection of the optical sheet.

Figure 10A:
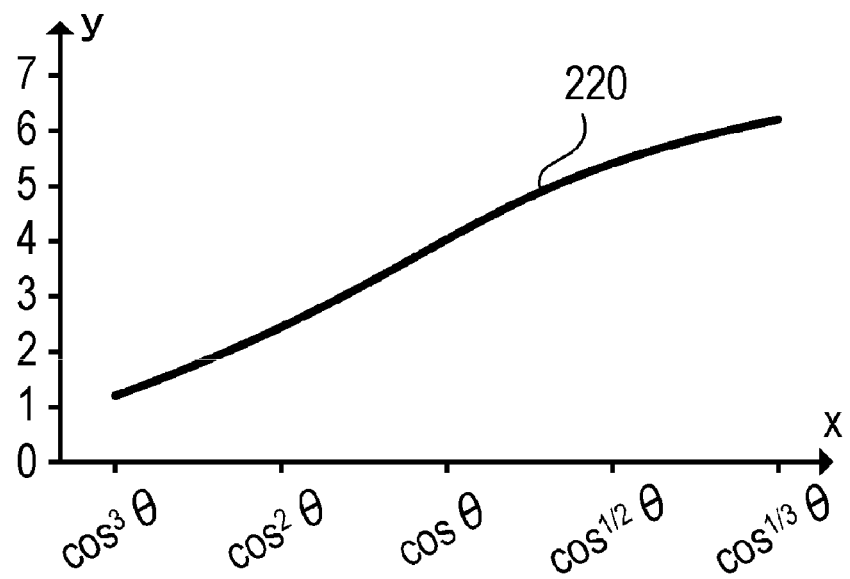
FIG. 10A and FIG. 10B are graphs depicting an example of a relationship between directivity of light from the emission unit and a zero cross point.
Figure 10B:
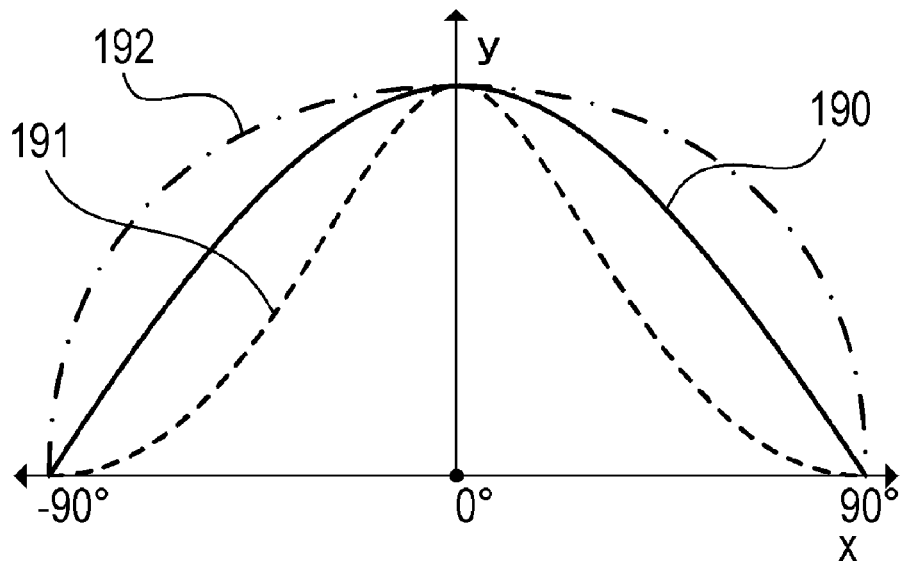

FIG. 10A is a graph depicting an example of the relationship between the directivity of light from the emission unit (LED chip) and Rd which is the position facing the zero cross point. In FIG. 10A, the x axis indicates directivity and the y axis indicates Rd at the position facing the zero cross point. FIG. 10B is a graph depicting an example of the relationship between the directivity of light from the emission unit (LED chip) and the emission intensity distribution. In FIG. 10B, the x axis indicates an angle from the direction perpendicular to the light source substrate toward the optical sheet side, and the y axis indicates the emission brightness at a position that is a predetermined distance away in a direction perpendicular to the light source substrate toward the optical sheet side.

If the emission intensity distribution of the emission unit has Lambertian distribution (for example, the emission intensity conforms to cos θ; the emission intensity distribution has the curve 190 in FIG. 10B), Rd at the position facing the zero cross point is approximately 4. Whereas if the directivity of the light from the emission unit is high (for example, the emission intensity conforms to $\cos^3 \theta$; the emission intensity distribution has the curve 191 in FIG. 10B), Rd at the position facing the zero cross point becomes a value smaller than 4. This is because the directivity of the light from the emission is higher, the spread of the brightness distribution on the back face of the optical sheet is further suppressed, and the zero cross point becomes closer to the position facing the emission center of the emission unit. If the directivity of the light from the emission unit is weak (for example, the emission intensity conforms to $\cos^{1/3} \theta$; the emission intensity distribution has the curve 192 in FIG. 10B), Rd at the position facing the zero cross point becomes a value greater than 4. The directivity can be controlled by using a lens or a reflecting plate which can change the directivity and diffusibility of light.

Therefore if the light source substrate has a plurality of emission units that emit a different directivity from one another, it is preferable that the distance between a processing target emission unit 111 and the optical sensor for adjustment is not uniform. In concrete terms, it is preferable that the distance between the emission center of an emission unit that emits light having high directivity and an optical sensor that is used for adjusting emission brightness of this emission unit is shorter than the distance between the emission center of an emission unit that emits light having low directivity and an optical sensor that is used for adjusting emission brightness of this emission unit.

FIG. 11 is one example of a correspondence table for a case where the light source substrate has a plurality of emission units that emit light having mutually different directivity (correspondence table showing correspondence relationship of processing sequence of a plurality of emission units 111, an emission unit 111 and an optical sensor for adjustment). In the example in FIG. 4, the optical sensor 113 disposed at a position of Rd=4.03 is used as the optical sensor for adjustment for all the emission units 111 when the emission brightness is adjusted. In the example of FIG. 11, however, an optical sensor 113 disposed at a position of Rd=4.72 or Rd=5.02 is used as the optical sensor for adjustment, if the emission unit 111 is located at the edge of the light source substrate. In concrete terms, when emission brightness is adjusted for a total of 20 emission unit 111, that is the emission units 111 (1, 1, 1) to 111 (1, 1, 5), 111 (1, 2, 1) to 111 (1,2, 4), 111 (1, 2, 8), 111 (2, 1, 1), 111 (2, 1, 5) to 111 (2, 1, 8) and 111 (2, 2, 4) to 111 (2, 2, 8), an optical sensor 113 disposed at a position of Rd=4.72 or Rd=5.02 is used as the optical sensor for adjustment.

Figure 12A:
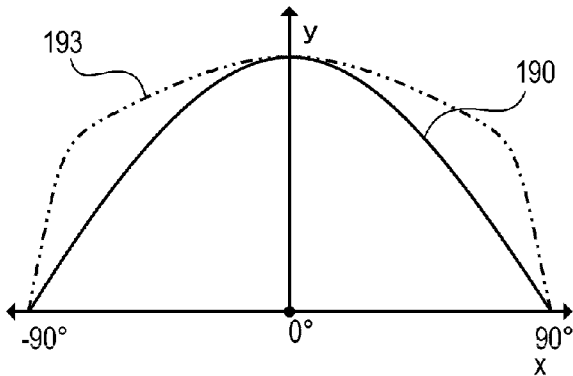
FIG. 12A to FIG. 12C are diagrams depicting an example of a positional relationship between an emission unit and an optical sensor for adjustment according to Embodiment 1.

This is because the directivity of the light from the emission unit is decreased because of the light 121 from the LED chip 112 reflecting on a side wall face of the backlight apparatus. In concrete terms, the directivity of the light from the emission unit decreases as the position is closer to the edge of the light source substrate. FIG. 12A is a graph showing an example of the directivity of the light from the LED chip 112. The curve 190 shows the Lambertian distribution. The intensity distribution of the light from an emission unit disposed on an edge of the light source substrate is a curve 193 of which directivity is lower than the curve 190 (Lambertian distribution).

In the case of FIG. 11, the emission units and the optical sensors for adjustment are corresponded so that a distance between an emission center of an emission unit that is close to the edge of the light source substrate and an optical sensor for adjustment corresponding to this emission unit is longer than a distance between an emission center of an emission unit that is distant from the edge of the light source substrate and an optical sensor for adjustment corresponding to this emission unit.

By using an optical sensor 113 of which Rd value is high to adjust the emission brightness of an emission unit 111 that emits light having low directivity, the detection error of the optical sensor 113, due to deflection of the optical sheet 106, can be decreased.

Figure 12B:
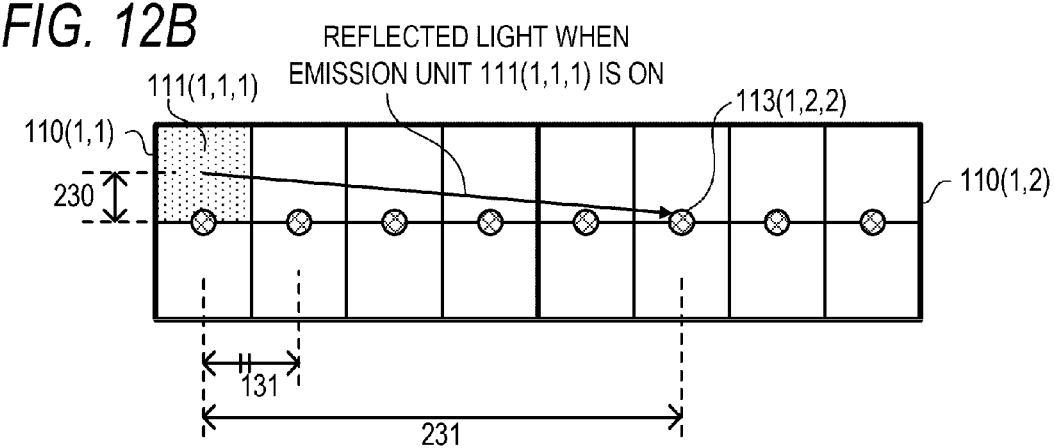

FIG. 12B is a schematic diagram depicting a positional relationship between an emission unit 111 (1, 1, 1) and an optical sensor 113 (1, 2, 2) (optical sensor for adjustment). In this embodiment, when the emission brightness of the emission unit 111 (1, 1, 1) is adjusted, the optical sensor 113 (1, 2, 2) located at a position where the detection error due to deflection of the optical sheet 106 is small, is used instead of the optical sensor 113 which is closest to the emission unit 111 (1, 1, 1). Since the vertical distance 230 is 0.5 times the LED pitch 131, and the horizontal distance 231 is 5 times the LED pitch 131, the distance between the emission center of the emission unit 111 (1, 1, 1) and the optical sensor 113 (1, 2, 2) is 5.02 times the LED pitch 131 according to the Pythagorean Theorem. In this embodiment, it is assumed that the LED pitch 131 and the diffusion distance 130 are the same, hence the distance between the emission center of the emission unit 111 (1, 1, 1) and the optical sensor 113 (1, 2, 2) is 5.02 times the diffusion distance 130.

Figure 12C:
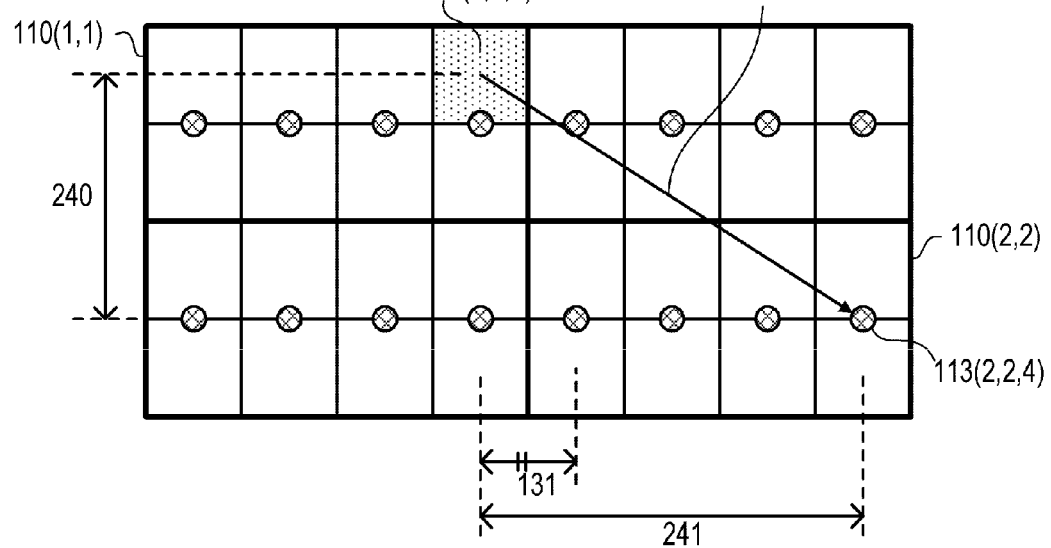

FIG. 12C is a schematic diagram depicting a positional relationship between an emission unit 111 (1, 1, 4) and an optical sensor 113 (2, 2, 4) (optical sensor for adjustment). In this embodiment, when the emission brightness of the emission unit 111 (1, 1, 4) is adjusted, the optical sensor 113 (2, 2, 4) located at a position where the detection error due to deflection of the optical sheet 106 is small, is used instead of the optical sensor 113 which is closest to the emission unit 111 (1, 1, 4). Since the vertical distance 240 is 2.5 times the LED pitch 131, and the horizontal distance 241 is 4 times the LED pitch 131, the distance between the emission center of the emission unit 111 (1, 1, 4) and the optical sensor 113 (2, 2, 4) is 4.72 times the LED pitch 131 according to the Pythagorean Theorem. In this embodiment, it is assumed that the LED pitch 131 and the diffusion distance 130 are the same, hence the distance between the emission center of the emission unit 111 (1, 1, 4) and the optical sensor 113 (2, 2, 4) is 4.72 times the diffusion distance 130.

As described above, according to this embodiment, detected values that fluctuate little due to deflection of the optical sheet can be acquired as the detected values of the reflected light from the optical sheet, therefore the emission brightness of the emission unit can be adjusted at high precision.

Figure 13A:
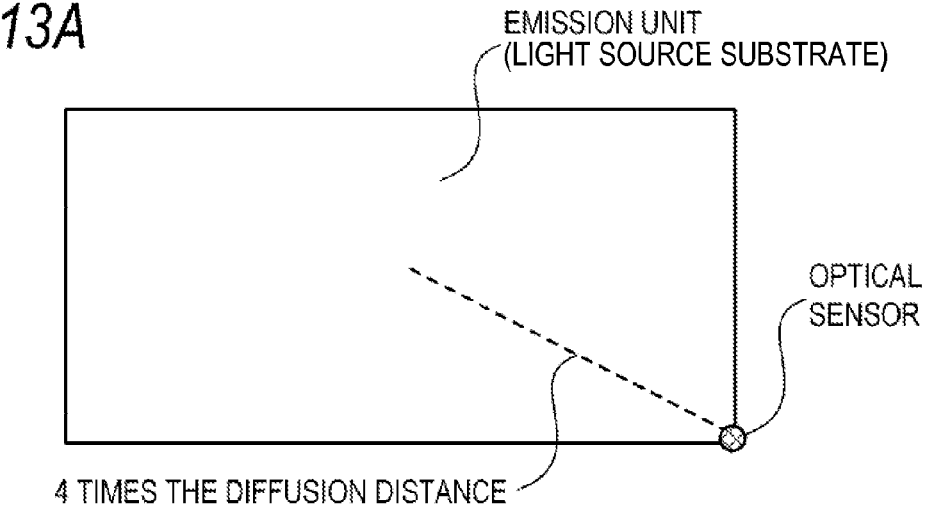
FIG. 13A to FIG. 13C are diagrams depicting an example of a light source substrate according to Embodiment 1.
Figure 13B:
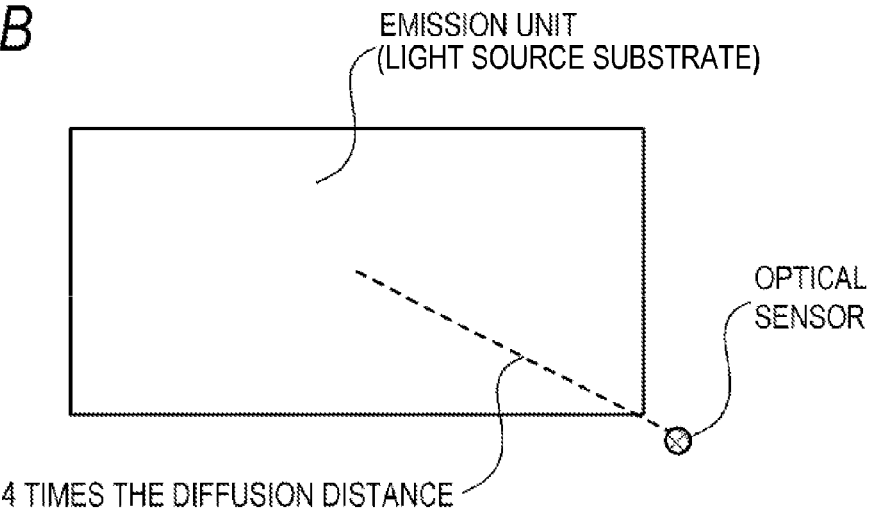
Figure 13C:
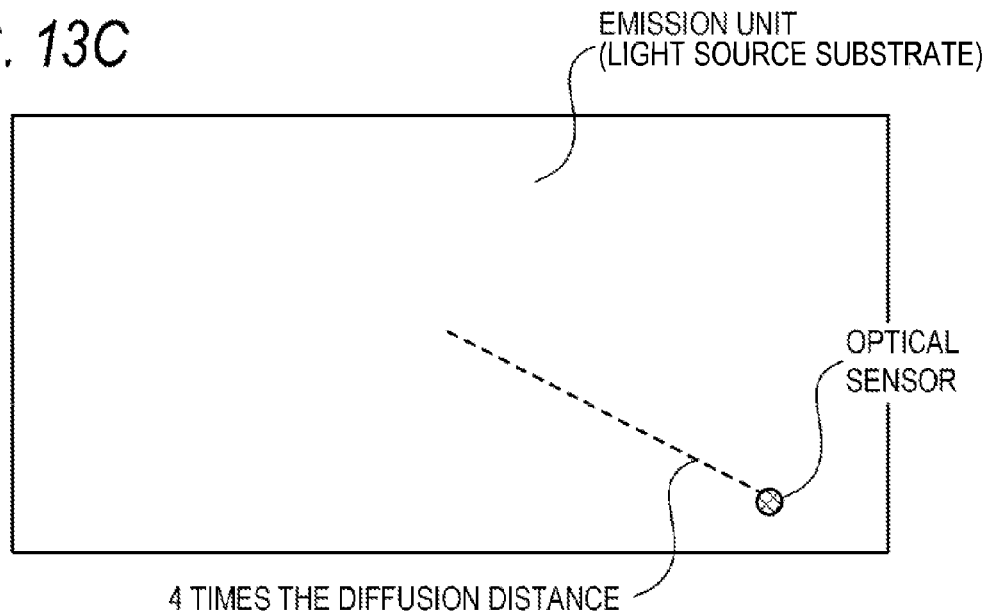

In this embodiment, a case of the light source substrate having a plurality of emission units was described, but the light source substrate may have only one emission unit. In this case, only one optical sensor is disposed to adjust the emission brightness of this one emission unit. This optical sensor is disposed so as to face the position on the back face of the optical sheet, where the absolute value of the change amount of brightness, due to deflection of the optical sheet, is a predetermined value or less. For example, as FIG. 13A and FIG. 13C show, the light source substrate may have one emission unit. If the emission intensity distribution of the emission unit has substantially a Lambertian distribution, the optical sensor can be disposed at a position that is distant from the emission center of the emission unit by approximately 4 times the diffusion distance. In FIG. 13A, the optical sensor is disposed on the edge of the emission unit. In FIG. 13B, the optical sensor is disposed outside the emission unit. In FIG. 13C, the optical sensor is disposed inside the emission unit.

In this embodiment, the case of the detection surface of the optical sensor 113 facing the optical sheet 106 side (direction perpendicular to the light source substrate toward the optical sheet side) was described, but the present invention is not limited to this. The detection surface of the optical sensor 113 may face a direction inclined from the direction perpendicular to the light source substrate only if the detection surface is facing the zero cross point (position where the change of brightness due to the deflection is a predetermined value or less) on the optical sheet.

In this embodiment, when light (to be more specific, reflected light) from the emission unit is detected, only this emission unit is turned ON, but emission units which are not influenced very much by the light from this emission unit may be turned ON as well.

<Embodiment 2>

A light source apparatus according to Embodiment 2 of the present invention will now be described. In Embodiment 1, a case when one light source (LED chip 112) is located to one emission unit 111 and the LED pitch 131 and the diffusion distance 130 are the same was described. In this embodiment, a case when a plurality of light sources (a plurality of LED chips 112) is disposed in one emission unit 111, and the LED pitch 131 and the diffusion distance 130 are not the same will be described. A composing element the same as Embodiment 1 is denoted with a same reference numeral for which description is omitted.

In Embodiment 1, one LED chip 112 is disposed in one emission unit 111, but a total of 4 LED chips 112 (2 rows×2 columns) or a total of 9 LED chips 112 (3 rows×3 columns), for example, may be disposed in one emission unit 111.

Figure 14A:
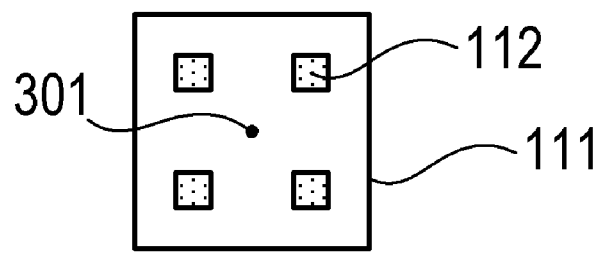
FIG. 14A to FIG. 14C are diagrams depicting an example of an emission unit according to Embodiment 2.

FIG. 14A is a schematic diagram depicting an example when a total of 4 LED chips 112 (2 rows×2 columns) are disposed in one emission unit 111. The 4 LED chips 112 are arranged at equal intervals. The point 301 is the center point of the emission unit 111, and the center point of the 4 LED chips 112 and the center point 301 match. Therefore the emission center of the emission unit 111 is the point 301.

Figure 14B:
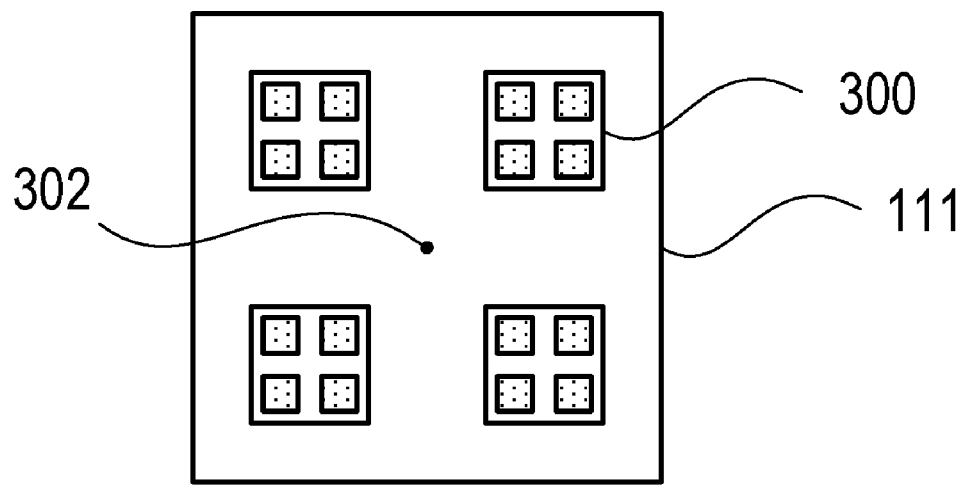

FIG. 14B is a schematic diagram depicting an example of disposing a total of 4 LED chips 300 (2 rows×2 columns) in one emission unit 111. In FIG. 14A, one white LED is used as one LED chip 112, but in FIG. 14B, one LED chip 300 is constituted by a plurality of LEDs which emits mutually different colors of light. In concrete terms, one LED chip 300 is constituted by 4 LEDs: one red LED which emits red light, two green LED rays which emit green light, and one blue LED which emits blue light. One LED chip 300 corresponds to 1 LED chip 112 in FIG. 14A. Therefore FIG. 14A and FIG. 14B are regarded as equivalent to each other. The point 302 is the center point of the emission unit 111, and the center point of the 4 LED chips 300 and the center point 302 match. Therefore the emission center of the emission unit 111 is the point 302.

Figure 14C:
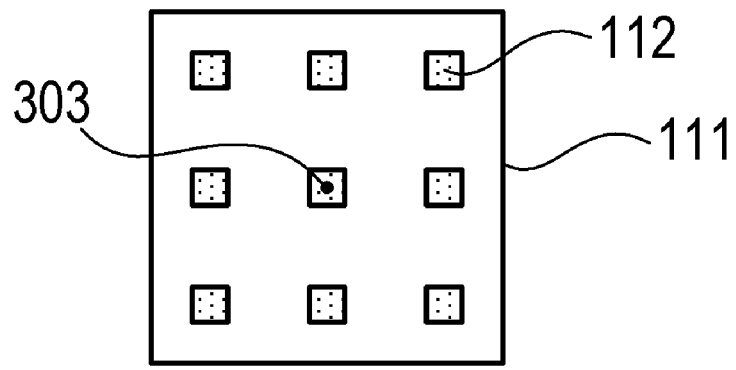

FIG. 14C is a schematic diagram depicting an example of disposing a total of 9 LED chips 112 (3 rows×3 columns) in one emission unit 111. The 9 LED chips 112 are arranged at equal intervals. The point 303 is the center point of the emission unit 111, and the center point of the 9 LED chips 112 and the center point 303 match. Therefore the emission center of the emission unit 111 is the point 303.

The graph in FIG. 9 of Embodiment 1 shows that if a standard LED chip of which emission intensity distribution has Lambertian distribution (cos θ) is used, the detection error of the optical sensor 113 becomes smallest when Rd is around 4. In other words, the graph in FIG. 9 shows that the position on the optical sheet facing the position where Rd is around 4 is the zero cross point. In the case of disposing a plurality of LED chips 112 on one emission unit 111 as well, the same concept as the case of disposing one LED chip 112 on one emission unit 111 can be applied. This will be described hereinbelow.

Figure 15:
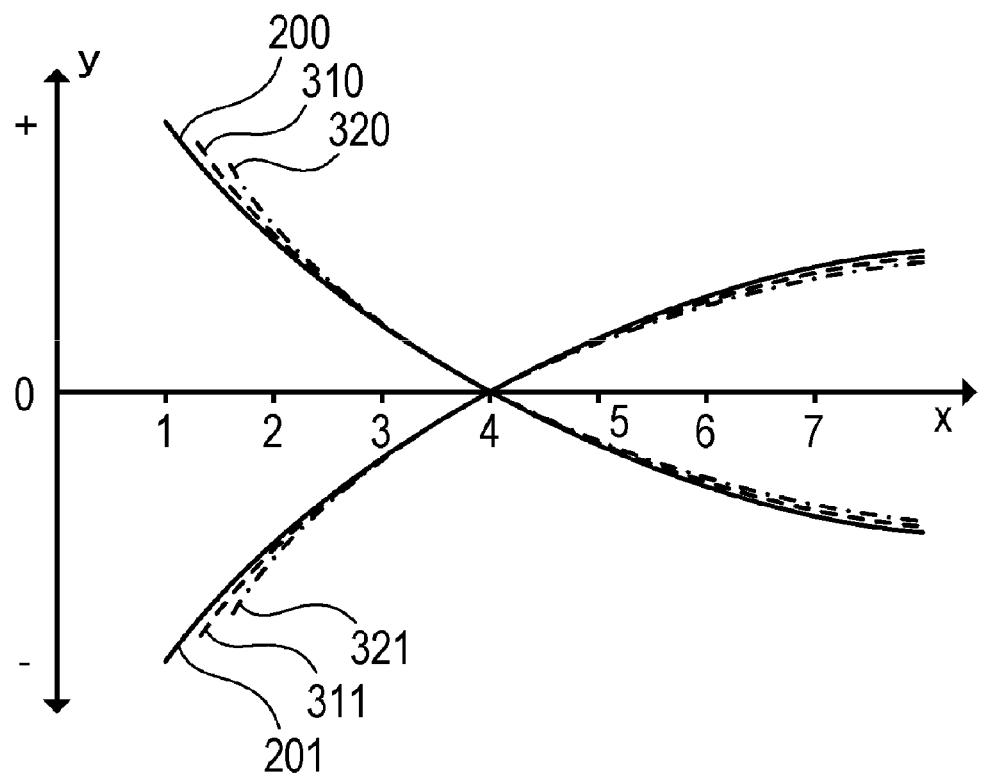
FIG. 15 is a graph depicting an example of a relationship between the change amount of brightness due to deflection of the optical sheet and Rd.

FIG. 15 shows an example of a relationship between the change amount of the brightness on the back face of the optical sheet 106 and Rd. The x axis in FIG. 15 indicates Rd. And the y axis in FIG. 15 indicates the change amount of the brightness (brightness on the back face of the optical sheet) generated by deflection of the optical sheet, that is a detection error of the optical sensor.

The curve 200 and the curve 201 indicate the detection errors when one LED chip is disposed in one emission unit 111. The curve 200 shows the detection error when the optical sheet 106 is deflected in the minus direction. And the curve 201 shows the detection error when the optical sheet 106 is deflected in the plus direction.

The curve 310 and the curve 311 indicate the detection errors when a total of 4 LED chips (2 rows×2 columns) are disposed in one emission unit 111. The curve 310 shows the detection error when the optical sheet 106 is deflected in the minus direction. And the curve 311 shows the detection error when the optical sheet 106 is deflected in the plus direction. The curve 320 and the curve 321 indicate the detection errors when a total of 9 LED chips (3 rows×3 columns) are disposed in one emission unit 111. The curve 320 shows the detection error when the optical sheet 106 is deflected in the minus direction. And the curve 321 shows the detection error when the optical sheet 106 is deflected in the plus direction.

As FIG. 15 shows, the zero cross point does not depend on the number of LED chips 112 disposed in one emission unit 111. In concrete terms, if the emission intensity distribution of the emission unit 111 (emission intensity distribution of each LED chip 112) has substantially a Lambertian distribution, the position on the optical sheet facing a position where Rd is approximately 4 becomes the zero cross point. In other words, if the emission intensity distribution has substantially a Lambertian distribution, the detection error of the optical sensor 113 is smallest at a position which is distant from the emission center of the emission unit by the distance approximately 4 times the distance between the emission unit and the optical sheet.

Figure 16A:
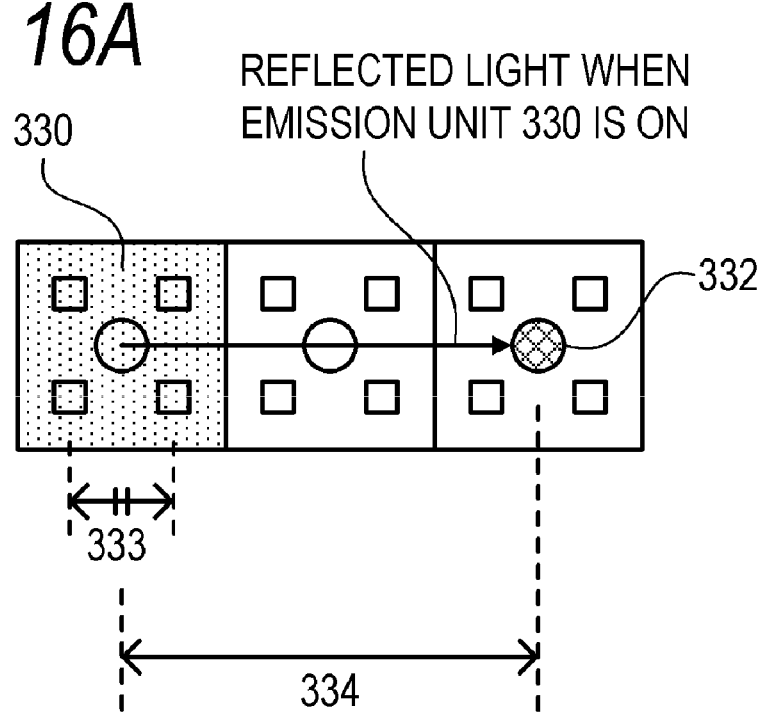
FIG. 16A and FIG. 16B are diagrams depicting an example of an emission unit and an optical sensor for adjustment according to Embodiment 2.

FIG. 16A is a schematic diagram depicting an example of the positional relationship between an emission unit and an optical sensor for adjustment corresponding to the emission unit in a case when a total of 4 LED chips (2 rows×2 columns) are disposed in one emission unit.

In the case of FIG. 16A, when the emission brightness of the emission unit 330 is adjusted, the optical sensor 332, which is the third closest to the emission unit 330, is used instead of the optical sensor closest to the emission unit 330. The distance 334 between the emission center of the emission unit 330 and the optical sensor 332 is 4.00 times the LED pitch 333. If the LED pitch 333 and the diffusion distance 130 are the same, then the distance between the emission center of the emission unit 330 and the optical sensor 332 is 4.00 times the diffusion distance 130 (that is, Rd=4.00). As a result, the detection error, due to deflection of the optical sheet 106, can be sufficiently decreased.

Figure 16B:
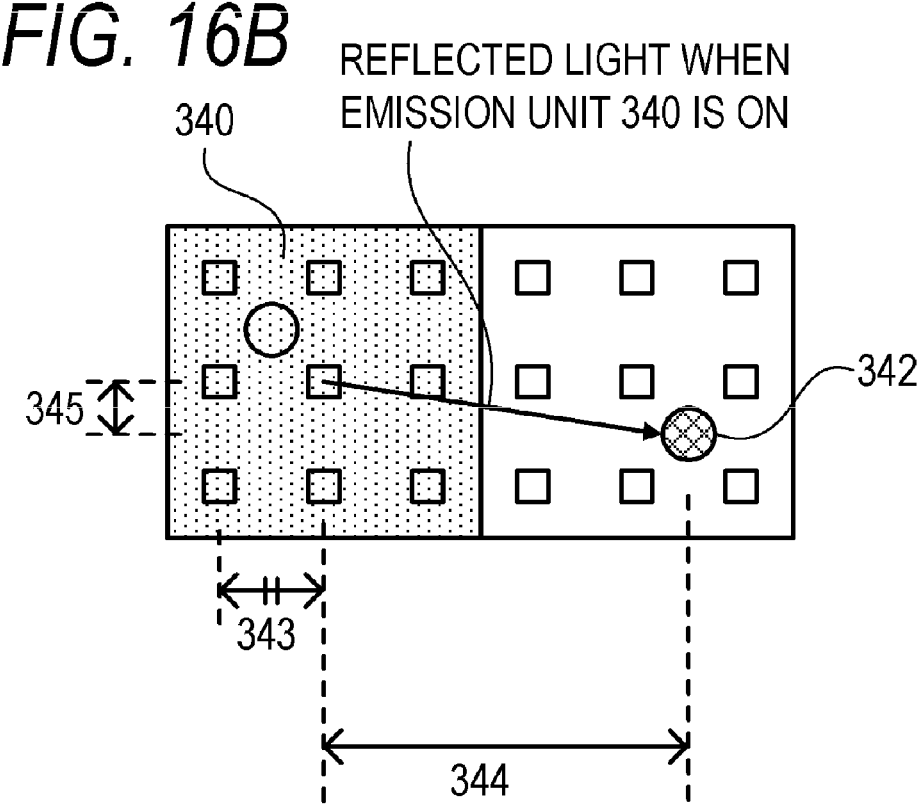

FIG. 16B is a schematic diagram depicting an example of the positional relationship between an emission unit and an optical sensor for adjustment corresponding to the emission unit in a case when a total of 9 LED chips (3 rows×3 columns) are disposed in one emission unit.

In the case of FIG. 16B, when the emission brightness of the emission unit 340 is adjusted, the optical sensor 342, which is the second closest to the emission unit 340, is used instead of the optical sensor closest to the emission unit 340. Since the vertical distance 345 is 0.5 times the LED pitch 343, and the horizontal distance 344 is 3.5 times the LED pitch 343, the distance between the emission center of the emission unit 340 and the optical sensor 342 is 3.54 times the LED pitch 343 according to the Pythagorean Theorem. If the LED pitch 343 and the diffusion distance 130 are the same, then the distance between the emission center of the emission unit 340 and the optical sensor 342 is 3.54 times the diffusion distance 130 (that is, Rd=3.54). As a result, the detection error due to deflection of the optical sheet 106 can be sufficiently decreased.

In the examples of FIG. 16A and FIG. 16B, an example of not using the optical sensor closest to the emission unit was shown, but the detection error due to deflection of the optical sheet 106 can be decreased even if the optical sensor closest to the emission unit is used. FIG. 17 shows an example of the configuration allowing a decrease in detection errors due to deflection of the optical sheet 106 even if the optical sensor closest to the emission unit is used.

FIG. 17 is a schematic diagram depicting an example of the positional relationship between an emission unit and an optical sensor for adjustment corresponding to the emission unit in the case when a total of 18 LED chips (6 rows×6 columns) are disposed in one emission unit.

In the example in FIG. 17, an optical sensor 352, which is closest to the emission unit 350, is used when the emission brightness of the emission unit 350 is adjusted. Since the vertical distance 355 is 3 times the LED pitch 353, and the horizontal distance 354 is 3 times the LED pitch 353, the distance between the emission center of the emission unit 350 and the optical sensor 352 is 4.24 times the LED pitch 353 based on the Pythagorean Theorem. If the LED pitch 353 and the diffraction distance 130 are the same, then the distance between the emission center of the emission unit 350 and the optical sensor 352 is 4.24 times the diffusion distance 130 (that is, Rd=4.24). As a result, in the case when the size of one emission unit is large, the detection error, due to deflection of the optical sheet 106, can be sufficiently reduced even if the optical sensor closest to the emission unit is used.

Figure 18A:
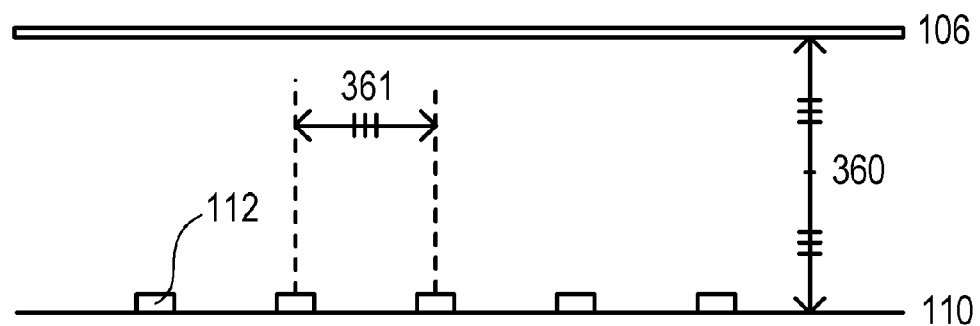
FIG. 18A and FIG. 18B are diagrams depicting an example of a positional relationship between an emission unit and an optical sensor for adjustment according to Embodiment 2.

FIG. 18A is a cross-sectional view depicting an example of a positional relationship between the LED substrate 110 and the optical sheet 106 when the diffusion distance is 2 times the LED pitch. The LED chips 112 are disposed on the LED substrate 110 at equal intervals. The interval of the LED chips 112 is regarded as the LED pitch 361. The optical sheet 106 is disposed parallel with the LED substrate 110. The distance between the optical sheet 106 and the LED substrate 110 is regarded as the diffusion distance 360. In the case of a backlight apparatus using LED chips 112 that have standard directivity, the brightness unevenness of light after transmitting through the optical sheet 106 can be sufficiently decreased by disposing each member so that the diffusion distance 360 is sufficiently longer than the LED pitch 361.

Figure 18B:
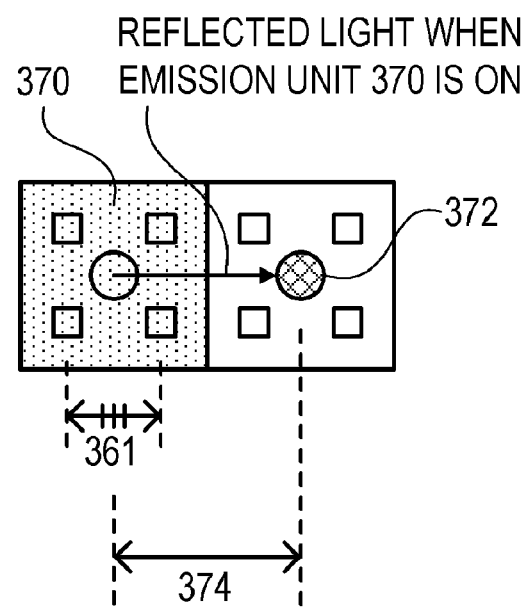

FIG. 18B is a schematic diagram depicting an example of the positional relationship between an emission unit and an optical sensor for adjustment that corresponds to the emission unit in a case when a total of 4 LED chips (2 rows×2 columns) are disposed in one emission unit. FIG. 18B shows an example in a case when the diffusion distance is 2 times the LED pitch.

In the case of FIG. 18B, when the emission brightness of the emission unit 370 is adjusted, the optical sensor 372, which is the second closest to the emission unit 370, is used instead of the optical center closest to the emission unit 370. The distance between the emission center of the emission unit 370 and the optical sensor 372 is 2.00 times the LED pitch 361. Since the diffusion distance 130 is 2 times the LED pitch 361, the distance between the emission center of the emission unit 370 and the optical sensor 372 is 4.00 times the diffusion distance 130 (that is, Rd=4.00). As a result, the detection error due to deflection of the optical sheet 106 can be sufficiently decreased.

As described above, according to this embodiment, detected values that fluctuate little due to deflection of the optical sheet can be acquired, just like Embodiment 1, even if a plurality of light sources are disposed on the light source substrate, or even if the LED pitch and the diffusion distance are not the same.

<Embodiment 3>

A light source apparatus according to Embodiment 3 of the present invention will now be described. In Embodiment 1 and Embodiment 2, a configuration of using an optical sensor, which is disposed in a position that faces a position on the back face of the optical sheet 106 where fluctuation of the brightness due to deflection of the optical sheet 106 is sufficiently small, was described. However if such an optical sensor is used for all the emission units 111, the number of optical sensors 113 increases and the manufacturing cost increases. In this embodiment, a configuration which allows decreasing brightness unevenness of the light source apparatus using a small number of optical sensors 113 will be described. A composing element the same as Embodiment 1 or Embodiment is denoted with a same reference numeral, for which description is omitted.

Figure 19A:
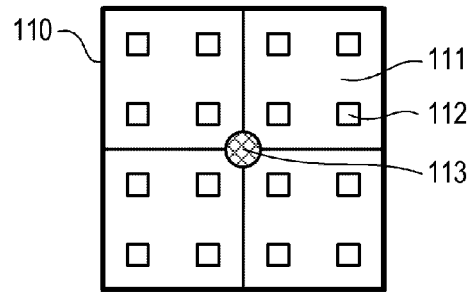
FIG. 19A to FIG. 19C are diagrams depicting an example of a light source apparatus according to Embodiment 3.

FIG. 19A is a schematic diagram depicting an example of a configuration of an LED substrate 110 according to this embodiment. In FIG. 19A, the LED substrate 110 has a total of 4 emission units 111 (2 rows×2 columns). 4 LED chips 112 are disposed at equal intervals in each emission unit 111. A backlight apparatus (light source apparatus) according to this embodiment can adjust the emission brightness for each emission unit 111. One optical sensor 113 is disposed in each LED substrate 110. The optical sensor 113 is disposed at the center of the 4 emission units 111 (that is, the center of the LED substrate 110). Therefore according to this embodiment, the number of optical sensors is smaller than the case of disposing optical sensors as shown in FIG. 2A or FIG. 16A.

Figure 19B:
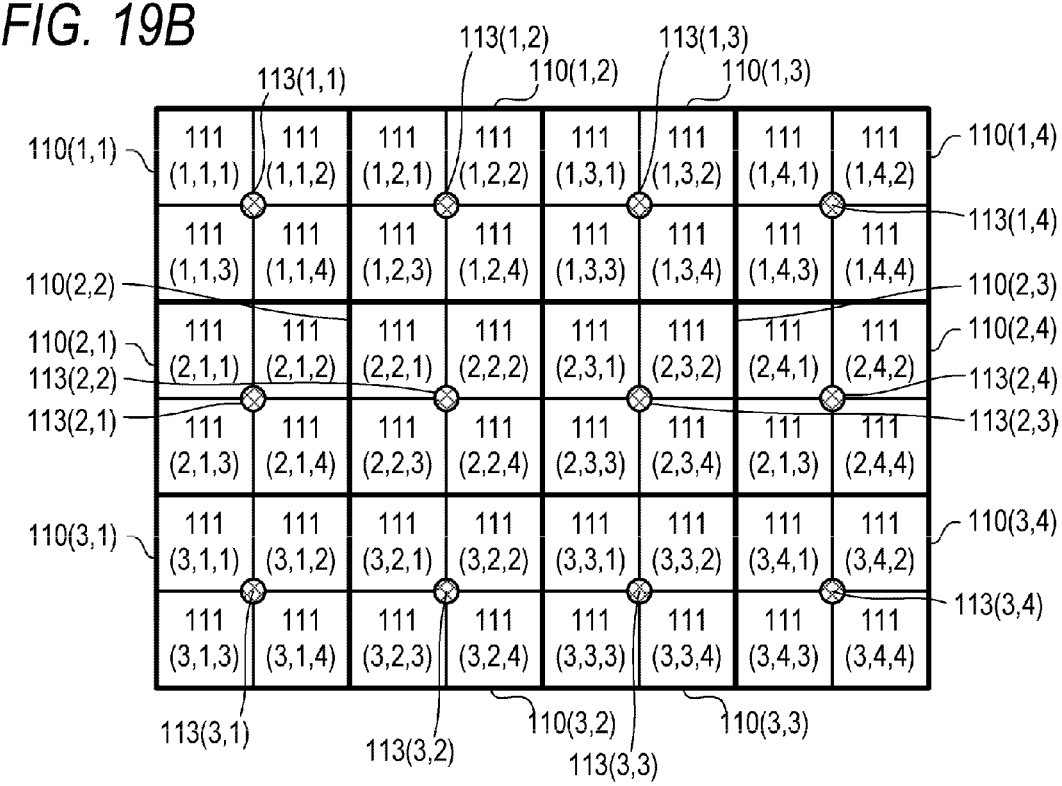

FIG. 19B is a schematic diagram depicting an example of the arrangement of the LED substrate 110, the emission unit 111 and the optical sensor 113 when viewed from the front direction (color liquid crystal panel 105 side). The LED substrate 110 (1, 2), the LED substrate 110 (1, 3) and the LED substrate 110 (1, 4) are disposed in the sequence on the right side of the LED substrate 110 (1, 1), which is disposed on the upper left corner. The LED substrate 110 (2, 1) and the LED substrate 110 (3, 1) are disposed in the sequence under the LED substrate 110 (1, 1), which is disposed on the upper left corner. The LED substrate 110 (2, 2), the LED substrate 110 (2, 3) and the LED substrate 110 (2, 4) are disposed in this sequence on the right of the LED substrate 110 (2, 1). The LED substrate 110 (3, 2), the LED substrate 110 (3, 3), and the LED substrate 110 (3, 4) are disposed in this sequence on the right of the LED substrate 110 (3, 1). As described above, the light source substrate 101 has a total of 12 substrates 110 (3 rows×4 columns) (a total of 48 emission units 111 arranged in 6 rows×8 columns).

The LED substrate 110 (1, 1) has the emission unit 111 (1, 1, 1), the emission unit 111 (1, 1, 2), the emission unit 111 (1, 1, 3) and the emission unit 111 (1, 1, 4). The optical sensor 113 (1, 1) is disposed in the LED substrate 110 (1, 1). This is the same for the other LED substrates.

Figure 19C:
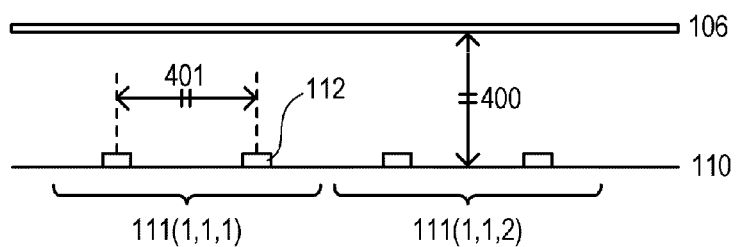

FIG. 19C is a cross-sectional view depicting an example of the positional relationship of the LED substrate 110 and the optical sheet 106. Each LED chip 112 is disposed at equal intervals. The interval of the LED chips 112 is regarded as the LED pitch 401. The optical sheet 106 is disposed parallel with the LED substrate 110. The distance between the optical sheet 106 and the LED substrate 110 is regarded as the diffusion distance 400. Here it is assumed that the LED pitch 401 and the diffusion distance 400 are the same.

FIG. 20 is a correspondence table showing an example of the correspondence relationship of a processing sequence, an emission unit 111 and an optical sensor for adjustment determined for a plurality of emission units 111. The processing described in Embodiment 1 (acquiring a detected value and outputting the value to the microcomputer 125) is executed 48 times, which is the same number as the number of emission units 111. In FIG. 20, only 4 LED substrates, LED substrates 110 (1, 1) to 110 (1, 4) are illustrated for simplification. The correspondence of the emission unit 111 and the optical sensor for adjustment in the other LED substrates is the same as the case of the LED substrates 110 (1, 1) to 110 (1, 4).

In the first processing, the emission unit 111 (1, 1, 1) is turned ON and the other emission units 111 are turned OFF. Then the optical sensor 113 (1, 2) is selected as the optical sensor for adjustment, and the detected value by the optical sensor 113 (1, 2) is outputted to the microcomputer 125.

Figure 21A:
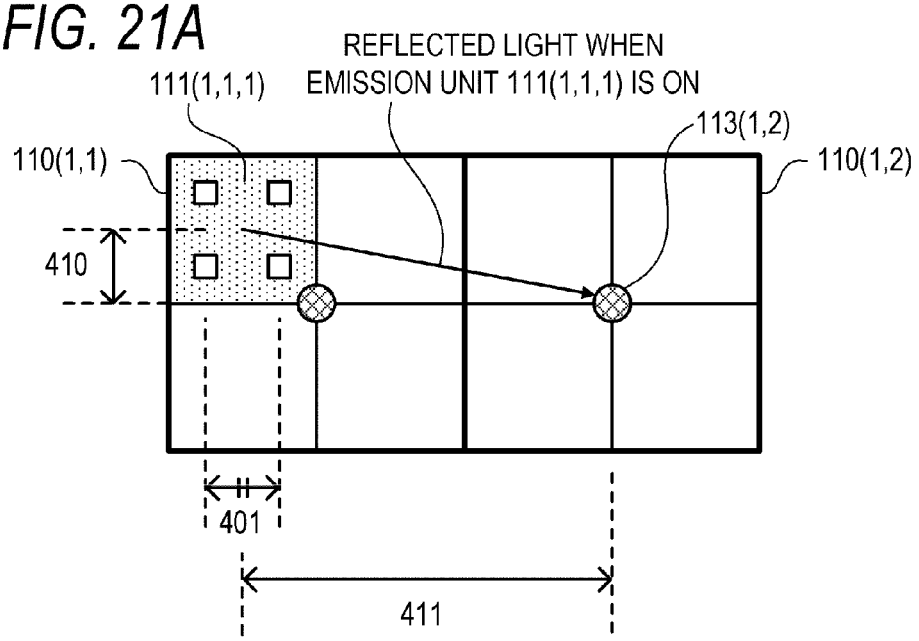
FIG. 21A to FIG. 21C are diagrams depicting an example of a positional relationship between an emission unit and an optical sensor for adjustment according to Embodiment 3.

FIG. 21A is a schematic diagram depicting a positional relationship between the emission unit 111 (1, 1, 1) and the optical sensor 113 (1, 2) when viewed from the front direction (color liquid crystal panel 105 side). The optical sensor 113 (1, 2), which is located relatively distant from the emission unit 111 (1, 1, 1), is used instead of the optical sensor 113 closest to the emission unit 111 (1, 1, 1). Since the vertical distance 410 is the same as the LED pitch 401, and the horizontal distance 411 is 5 times the LED pitch 401, the distance between the emission center of the emission unit 111 (1, 1, 1) and the optical sensor 113 (1, 2) is 5.10 times the LED pitch 401 based on the Pythagorean Theorem. In this embodiment, it is assumed that the LED pitch 401 is the same as the diffusion distance 400, so the distance between the emission center of the emission unit 111 (1, 1, 1) and the optical sensor 113 (1, 2) is 5.10 times the diffusion distance 400 (Rd=5.10).

As FIG. 20 shows, in the second processing, the emission unit 111 (1, 1, 2) is turned ON, and the other emission units 111 are turned OFF. Then the optical sensor 113 (1, 2) is selected as the optical sensor for adjustment, and the detected value by the optical sensor 113 (1, 2) is outputted to the microcomputer 125.

Figure 21B:
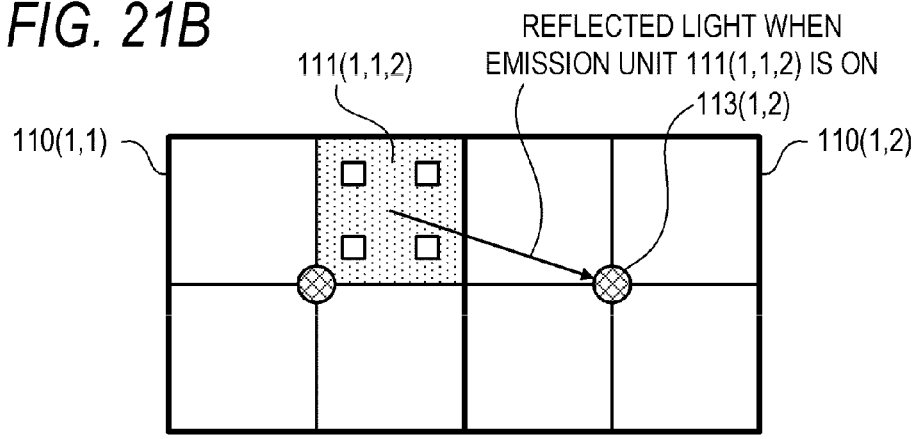

FIG. 21B is a schematic diagram depicting a positional relationship of the emission unit 111 (1, 1, 2) and the optical sensor 113 (1, 2) when viewed from the front direction (color liquid crystal panel 105 side). Based on a calculation method the same as the calculation method described in the first processing, the distance between the emission center of the emission unit 111 (1, 1, 2) and the optical sensor 113 (1, 2) is 3.16 times the diffusion distance 400 (Rd=3.16).

The third and later processing operations shown in the correspondence table in FIG. 20 are executed in the same manner. In the third and later processing operations, the distance between the emission center of the processing target emission unit 111 and the optical sensor for adjustment is 5.10 times or 3.16 times the diffusion distance 400.

As described above, change of brightness due to deflection of the optical sheet substantially becomes zero at a position on the back face of the optical sheet facing the position where Rd is approximately 4.

In this embodiment, a plurality of emission units includes the second emission unit and the third emission unit. The optical sensor that is used for adjusting the emission brightness of the second emission unit is disposed in a position that is more distant from the second emission unit than the position facing the position on the back face of the optical sheet where the change amount of brightness, due to deflection of the optical sheet when only the second emission unit is turned ON, is substantially zero. The optical sensor that is used for adjusting the emission brightness of the third emission unit is disposed in a position that is closer to the third emission unit than the position facing the position on the back face of the optical sheet where change amount of brightness, due to deflection of the optical sheet when only the third emission unit is turned ON, is substantially zero.

Figure 22:
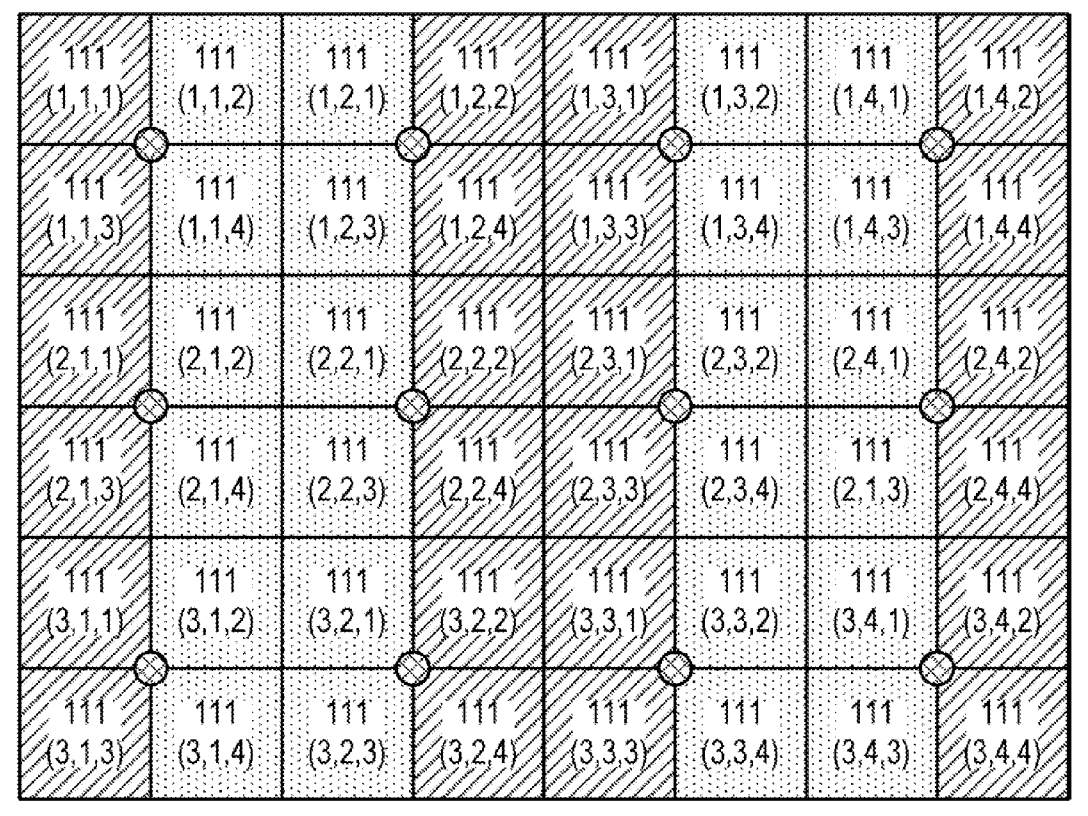

FIG. 22 is a schematic diagram depicting an example of a positional relationship between the emission unit 111 and the optical sensor for adjustment. In FIG. 22, the emission unit 111 (second emission unit) at a position where the optical sensor for adjustment is located at a position of Rd=5.10, is filled with the shaded pattern. For example, the emission unit 111 (1, 1, 1) and the emission unit 111 (1, 2, 2) are the second emission units. In FIG. 22, the emission unit 111 (third emission unit) at a position where the optical sensor for adjustment is located at a position of Rd=3.16, is filled with the dot pattern. For example, the emission unit 111 (1, 1, 2) and the emission unit 111 (1, 2, 1) are the third emission units. In FIG. 22, the number of the second emission unit and the number of the third emission units are the same. In this embodiment, the second emission units and the third emission units are dispersed so that an error of the emission brightness after adjustment, due to the change of brightness distribution on the back face of the optical sheet, is cancelled out. In concrete terms, the second emission unit and the third emission unit are adjacent to each other.

Figure 23:
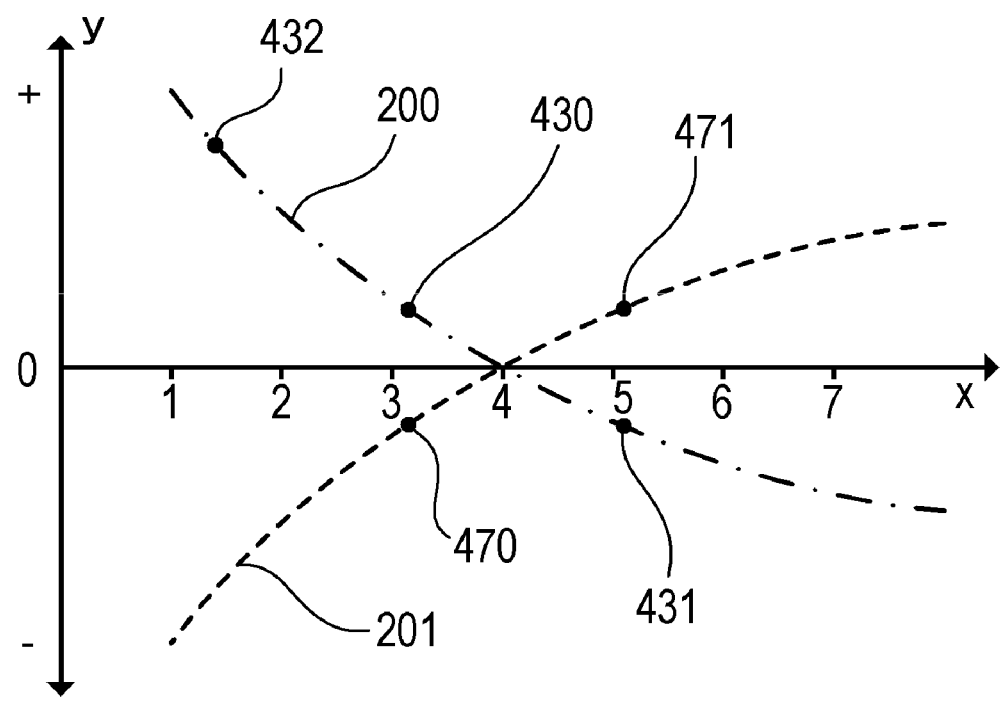
FIG. 23 is a graph depicting an example of a relationship between the change amount of brightness due to deflection of the optical sheet and Rd.

FIG. 23 shows an example of a relationship between the change amount of the brightness on the back face of the optical sheet 106 and Rd. The x axis in FIG. 23 indicates Rd. The y axis in FIG. 23 indicates the change amount of brightness (brightness on the back face of the optical sheet) generated by deflection of the optical sheet, that is, a detection error of the optical sensor. The curve 200 indicates a detection error when the optical sheet 106 is deflected in the minus direction. And the curve 201 shows a detection error when the optical sheet 106 is deflected in the plus direction. The position facing a position where Rd is approximately 4 is a zero cross point.

If the optical sheet 106 is deflected in the minus direction, an error in the plus direction is generated in the position facing the position of Rd=3.16, as shown by the point 430 (acquired detected value is greater than that of the case when the optical sheet is not deflected). In the position facing the position of Rd=5.10, an error in the minus direction is generated as shown by the point 431.

Figure 24A:
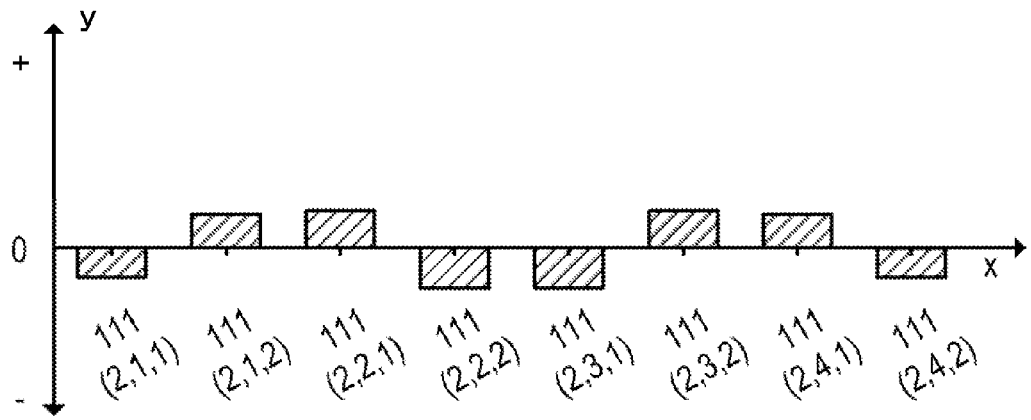
FIG. 24A to FIG. 24C are diagrams depicting an example of an error according to Embodiment 3.

FIG. 24A is a graph showing an example of the distribution of a detection error by the optical sensor for adjustment when the optical sheet 106 is deflected in the minus direction. The x axis in FIG. 24A shows 8 emission units lined in the row direction: 111 (2, 1, 1), 111 (2, 1, 2), 111 (2, 2, 1), 111 (2, 2, 2), 111 (2, 3, 1), 111 (2, 3, 2), 111 (2, 4, 1) and 111

(2, 4, 2). The y axis of FIG. 24A indicates the detection error by the optical sensor for adjustment when the optical sheet 106 is deflected for a predetermined amount in the minus direction.

A minus error is generated in the detected value by the optical sensor for adjustment corresponding to the emission unit 111 (2, 1, 1) although the absolute value of the error is not large, and an error in the plus direction is generated in the detected value by the optical sensor for adjustment corresponding to the emission unit 111 (2, 1, 2) although the absolute value of the error is not large. In the same manner, an error in the plus direction is generated in the detected value by the emission unit 111 (2, 2, 1) although the absolute value of the error is not large, and an error in the minus direction is generated in the detected value by the optical sensor for adjustment corresponding to the emission unit 111 (2, 2, 2) although the absolute value of the error is not large. The absolute value of the detection error generated by the emission unit 111 located around the center of the backlight apparatus is larger than that generated by the emission unit 111 located near the edge of the backlight apparatus. This is because the deflection of the optical sheet 106 is larger in the center area than in the edge area. In any case, however, the detection error is not so large.

As FIG. 24A shows, the emission unit 111 that generates a detection error in the minus direction and the emission unit 111 that generates a detection error in the plus direction are adjacent to each other.

Figure 24B:
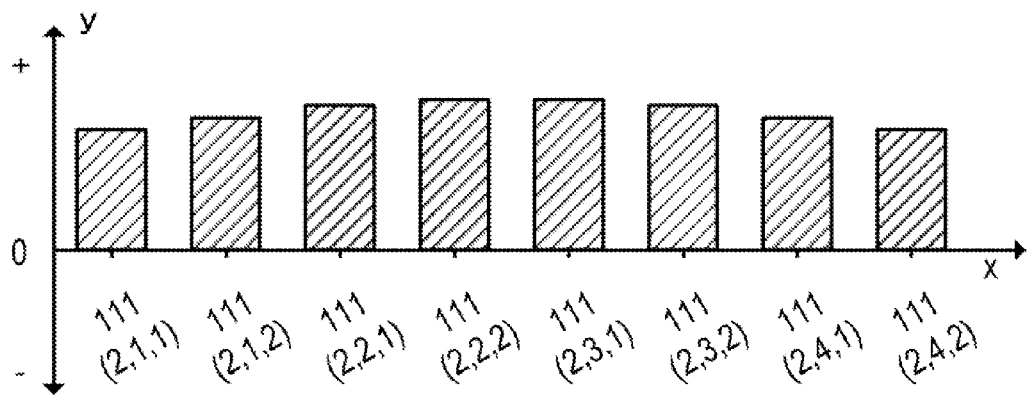
Figure 24C:
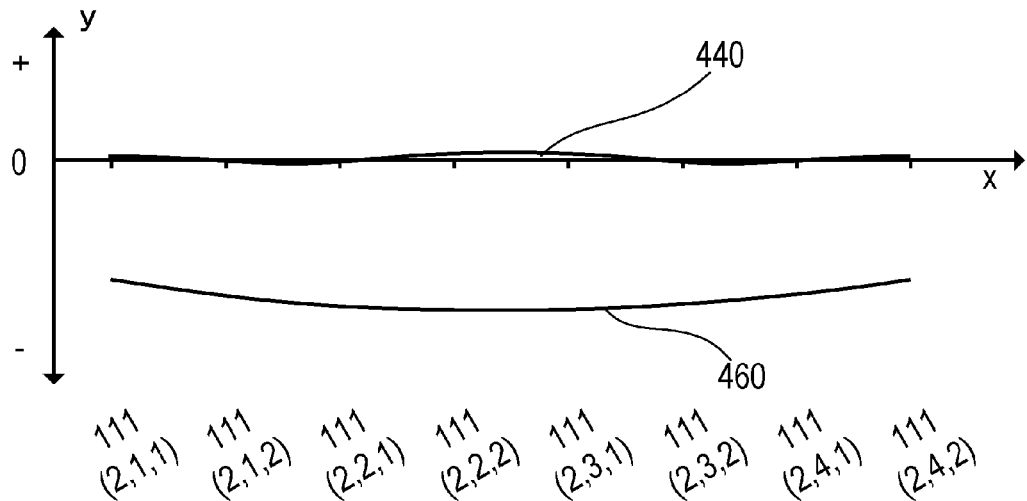

FIG. 24C is a graph showing the brightness distribution of the backlight apparatus after adjusting the emission brightness, when the optical sheet 106 is deflected in the minus direction. FIG. 24C shows the brightness distribution (brightness distribution on the front face (on the face opposite of the back face) of the optical sheet) when all the emission units are turned ON. The x axis in FIG. 24C is the same as the x axis in FIG. 24A. The y axis in FIG. 24C indicates an error of the brightness when all the emission units are turned ON at the emission brightness after the adjustment. As mentioned above, an error is generated in the detected value by the optical sensor 113 due to the deflection of the optical sheet 106. If the emission brightness is adjusted based on such a detected value including an error, an error (deviation from the target value) is generated in the emission brightness after the adjustment. As a result, an error is also generated in the brightness when all the emission units are turned ON at the emission brightness after the adjustment. The curve 440 shows a result when the emission brightness was adjusted according to the correspondence table in FIG. 20.

As FIG. 24A shows, an error in the minus direction is generated in the detected value in the case of the emission unit 111 (2, 1, 1). Therefore an error in the plus direction is generated in the emission brightness after the adjustment. In the case of the emission unit 111 (2, 1, 2), on the other hand, an error in the plus direction is generated in the detected value. Therefore an error in the minus direction is generated in the emission brightness after the adjustment. However an error of the emission brightness between the emission unit 111 (2, 1, 1) and the emission unit 111 (2, 1, 2), which are adjacent to each other, is cancelled out since light from the emission unit is sufficiently diffused in the backlight apparatus. As a result, an error of the brightness (brightness on the front face of the optical sheet) when all the emission units are turned ON at the emission brightness after the adjustment becomes a small value as the curve 440 in FIG. 24C shows. An error of the emission brightness among the other emission units 111, such as between the emission unit 111 (2, 2, 1) and the emission unit 111 (2, 2, 2) is also cancelled out, whereby an error of the brightness on the front face of the optical sheet in the backlight apparatus as a whole becomes a small value.

As a comparison, an example of adjusting the emission brightness of the emission unit 111 in the light source substrate 101 in FIG. 19B, as in the case of a prior art, using the detected value by the optical sensor 113 closest to the emission unit 111 is shown.

FIG. 25 is an example of a correspondence table to adjust the emission brightness by the method according to the prior art.

In the first processing, the emission unit 111 (1, 1, 1) is turned ON and the other emission units 111 are turned OFF. Then the optical sensor 113 (1, 1) which is closest to the emission unit 111 (1, 1, 1) is selected as the optical sensor for adjustment, and the detected value by the optical sensor 113 (1, 1) is outputted to the microcomputer 125.

Figure 21C:
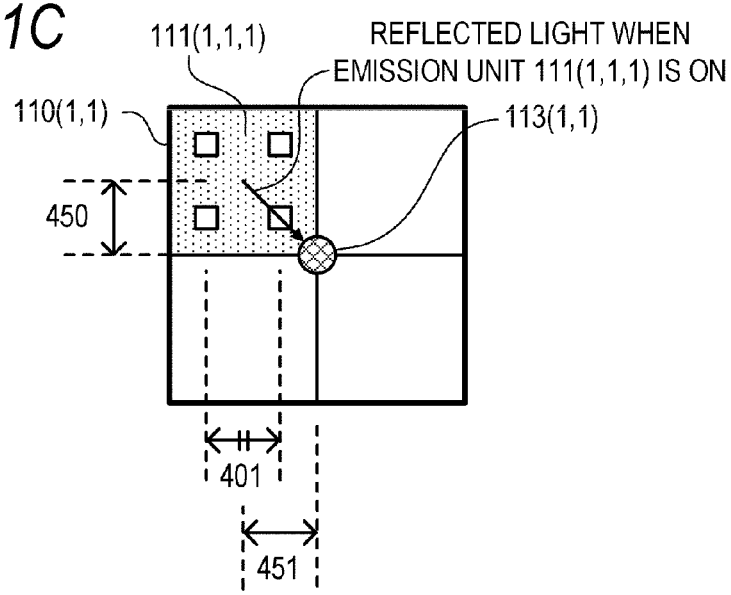

FIG. 21C is a schematic diagram depicting a positional relationship between the emission unit 111 (1, 1, 1) and the optical sensor 113 (1, 1) when viewed from the front direction (color liquid crystal panel 105 side). The optical sensor 113 (1, 1) which is closest to the emission unit 111 (1, 1, 1) is used. Since the vertical distance 450 is the same as the LED pitch 401, and the horizontal distance 451 is the same as the LED pitch 401, the distance between the emission center of the emission unit 111 (1, 1, 1) and the optical sensor 113 (1, 1) is 1.41 times the LED pitch 401 based on the Pythagorean Theorem. In this embodiment, it is assumed that the LED pitch 401 is the same as the diffusion distance 400, so the distance between the emission center of the emission unit 111 (1, 1, 1) and the optical sensor 113 (1, 1) is 1.41 times the diffusion distance 400 (Rd=1.41).

The third and later processing operations as well are executed in the same manner according to the sequence shown in FIG. 25. In this case, the distance between the emission center of the emission unit 111 and the optical sensor for adjustment is all 1.41 times the diffusion distance 400 (Rd=1.41).

If the optical sheet 106 is deflected in the minus direction, an error in the plus direction of which absolute value is large is generated in the detected value by the optical sensor in the position of Rd=1.41, as the point 432 in FIG. 23 shows.

FIG. 24B is a graph showing an example of the distribution of the detection error of the optical sensor for adjustment when the optical sheet 106 is deflected in the minus direction. The x axis and the y axis in FIG. 24B are the same as the x axis and the y axis in FIG. 24A. FIG. 24B shows the detection errors when an optical sensor for adjustment is selected according to the correspondence table in FIG. 25.

In the example in FIG. 24B, a detection error in the plus direction of which absolute value is larger is generated in the all emission units 111. The absolute value of the detection error is large in the emission unit 111 located near the center of the backlight apparatus than the emission unit 111 located near the edge thereof. This is because the deflection amount of the optical sheet 106 is larger in the center area than in the edge area.

The curve 460 in FIG. 24C shows a result when the emission brightness was adjusted according to the correspondence table in FIG. 25.

As FIG. 24B shows, an error in the plus direction is generated in the detected value in the case of the emission unit 111 (2, 1, 1). Therefore an error in the minus direction is generated in the emission brightness after the adjustment. In the same manner, an error in the plus direction is generated in the detected value in all the other emission units 111, such as the emission unit 111 (2, 1, 2), therefore an error in the minus direction is generated in the emission brightness after the adjustment.

According to the correspondence table in FIG. 20, the error of the emission brightness is cancelled out, hence the error can be reduced as shown in the curve 440. If the optical sensor closest to the emission unit is used according to the correspondence table in FIG. 25, on the other hand, not only the absolute value of the detection error is large, but also the error of the emission brightness is not cancelled out, hence an error in the minus direction of which absolute value is large is generated in the brightness on the front face of the optical sheet, as shown in the curve 460.

Now a case when the optical sheet 106 is deflected in the plus direction will be described. According to this embodiment, the error of brightness on the front face of the optical sheet can be reduced by following the correspondence table in FIG. 20, even if the optical sheet 106 is deflected in the plus direction.

If the optical sheet 106 is deflected in the plus direction, an error in the minus direction is generated in a position facing the position of Rd=3.16, as the point 470 in FIG. 23 shows. In a position facing the position of Rd=5.10, an error in the plus direction is generated as the point 471 in FIG. 23 shows.

Figure 26A:
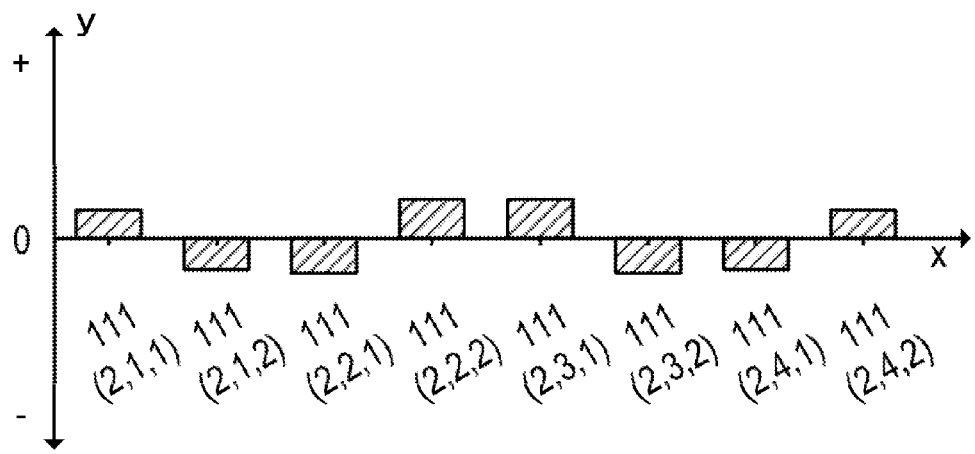
FIG. 26A and FIG. 26B are diagrams depicting an example of an error according to Embodiment 3.

FIG. 26A is a graph showing an example of the distribution of a detection error by the optical sensor for adjustment when the optical sheet 106 deflects in the plus direction. The x axis and the y axis in FIG. 26A are the same as the x axis and the y axis in FIG. 24A. As FIG. 26A shows, just like the case of the optical sheet 106 deflected in the minus direction (FIG. 24A), the emission unit 111 that generates the detection error in the minus direction and the emission unit 111 that generates the detection error in the plus direction are adjacent to each other.

Figure 26B:
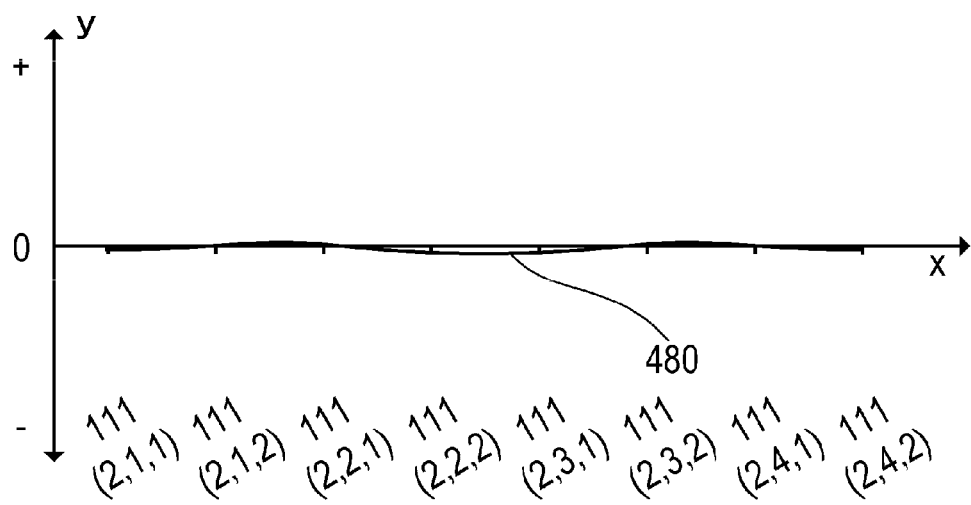

FIG. 26B is a graph showing the brightness distribution of the backlight apparatus after adjusting the emission brightness, when the optical sheet 106 is deflected in the plus direction. The x axis and the y axis in FIG. 26B are the same as the x axis and the y axis in FIG. 24C. As FIG. 26B shows, just like the case of the optical sheet 106 deflected in the minus direction (FIG. 24C), an error of emission brightness among the emission units 111 is cancelled out, whereby an error of the brightness on the front face of the optical sheet becomes a small value.

In this way, according to this embodiment, the second emission unit (the emission unit for which the optical sensor for adjustment is disposed on the position of Rd=5.10) and the third emission unit (the emission unit for which the optical sensor for adjustment is disposed on the position of Rd=3.16) are disposed at separate locations. Thereby the number of optical sensors can be reduced, and an error of brightness on the front face of the optical sheet when all the emission units are turned ON at the adjusted emission brightness can be decreased.

In the example in FIG. 19B, the number of the LED substrates 110 and the number of optical sensors 113 are the same (12). Now a configuration to decrease an error of the brightness on the front face of the optical sheet, even if the number of optical sensors 113 is decreased, will be described.

Figure 27:
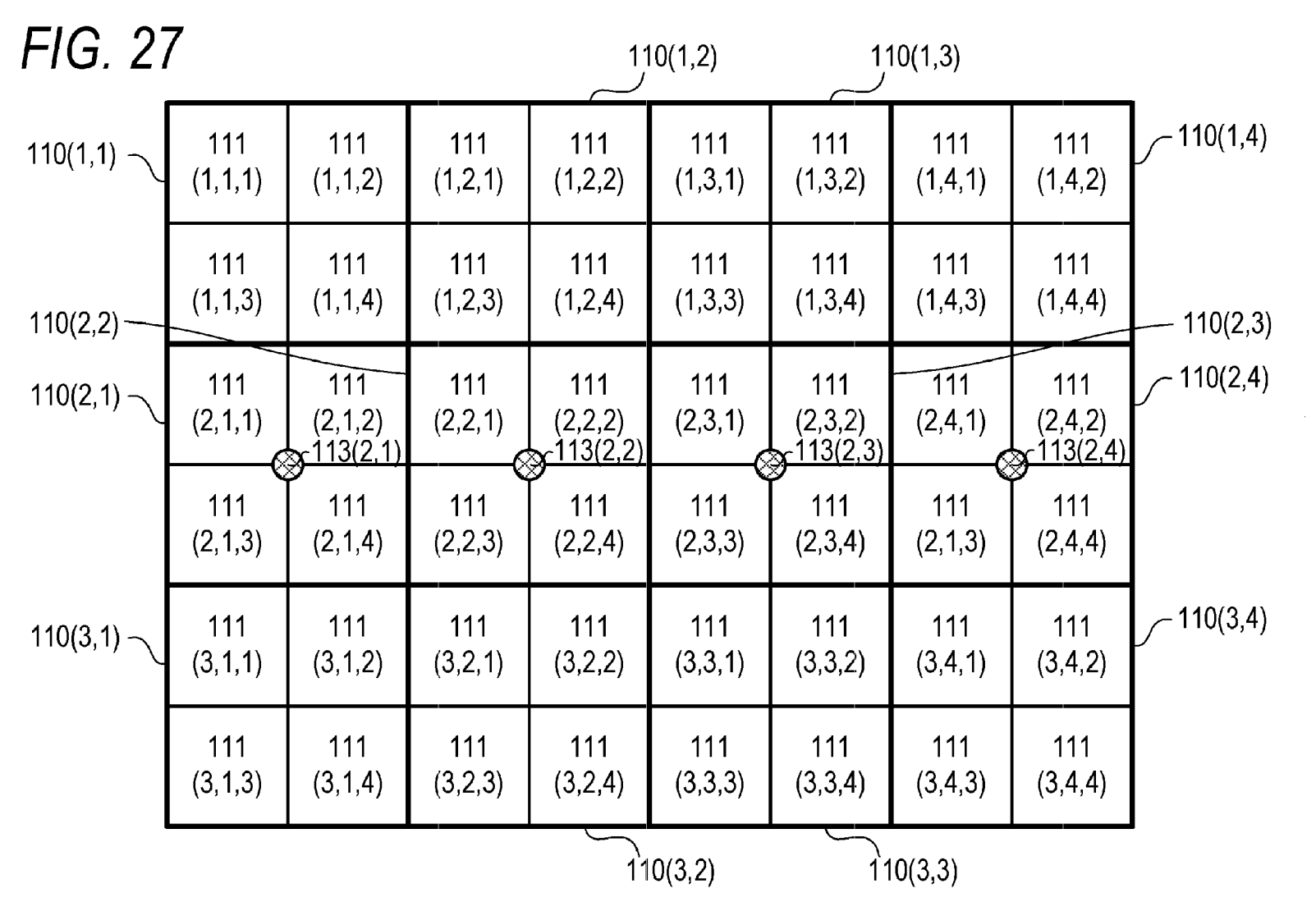

FIG. 27 is a schematic diagram depicting an example when the number of optical sensors 113 is further decreased from the example in FIG. 19B. In concrete terms, in FIG. 27, the optical sensors 113 (1, 1), 113 (1, 2), 113 (1, 3), 113 (1, 4), 113 (3, 1), 113 (3, 2), 113 (3, 3) and 113 (3, 4) in FIG. 19B are removed, and the number of optical sensors 113 is 4.

FIG. 28 is a correspondence table when the number of optical sensors 113 in FIG. 19B is decreased (configuration in FIG. 27). The processing described in Embodiment 1 (processing of acquiring a detected value and outputting the detected value to the microcomputer 125) is executed 48 times, the same number as the number of emission units 111. In FIG. 28, processing for 4 LED substrates: LED substrates 110 (1, 1) to 110 (1, 4) (that is, the first to sixteenth processing operations) are shown.

In the first processing, the emission unit 111 (1, 1, 1) is turned ON and the other emission units 111 are turned OFF. Then the optical sensor 113 (2, 1) is selected as the optical sensor for adjustment, and the detected value by the optical sensor 113 (2, 1) is outputted to the microcomputer 125. Here Rd becomes 5.10 at the position of the optical sensor 113 (2, 1).

In the second processing, the emission unit 111 (1, 1, 2) is turned ON and the other emission units 111 are turned OFF. Then the optical sensor 113 (2, 1) is selected as the optical sensor for adjustment, and the detected value by the optical sensor 113 (2, 1) is outputted to the microcomputer 125. Here Rd becomes 5.10 at the position of the optical sensor 113 (2, 1).

In the third processing, the emission unit 111 (1, 1, 3) is turned ON and the other emission units 111 are turned OFF. Then the optical sensor 113 (2, 1) is selected as the optical sensor for adjustment, and the detected value by the optical sensor 113 (2, 1) is outputted to the microcomputer 125. Here Rd becomes 3.16 at the position of the optical sensor 113 (2, 1).

In the fourth processing as well, Rd becomes 3.16 at the position of the optical sensor for adjustment. Hereafter processing operations up to the sixteenth processing are executed in the same manner. In this case, Rd becomes either 5.10 or 3.16 at the position of the optical sensor for adjustment.

The seventeenth to thirty-second processing operations are executed in the same manner as the processing according to the correspondence table of FIG. 20. For example, in the seventeenth processing for an emission unit 111 (2, 1, 1), an optical sensor 113 (2, 2) is selected as the optical sensor for adjustment, and Rd becomes 5.10 at the position of the optical sensor for adjustment. In the eighteenth processing for the emission unit 111 (2, 1, 2), the optical sensor 113 (2, 2) is selected as the optical sensor for adjustment, and Rd becomes 3.16 at the position of the optical sensor for adjustment. In the twenty first processing for the emission unit 111 (2, 2, 1), the optical sensor 113 (2, 1) is selected as the optical sensor for adjustment, and Rd becomes 3.16 at the position of the optical sensor for adjustment. In the twenty second processing for an emission unit 111 (2, 2, 2), the optical sensor 113 (2, 1) is selected as the optical sensor for adjustment, and Rd becomes 5.10 at the position of the optical sensor for adjustment.

FIG. 29 is a correspondence table when the number of optical sensors 113 in FIG. 19B is further decreased (configuration in FIG. 27). In FIG. 29, processing operations for 4 LED substrates: LED substrates 110 (3, 1) to 110 (3, 4) (that is, the thirty third to forty-eighth processing operations) are shown.

In the thirty-third processing, the emission unit 111 (3, 1, 1) is turned ON and the other emission units 111 are turned OFF. Then the optical sensor 113 (2, 1) is selected as the optical sensor for adjustment, and the detected value by the optical sensor 113 (2, 1) is outputted to the microcomputer 125. Here Rd becomes 3.16 at the position of the optical sensor 113 (2, 1).

In the thirty-fourth processing, the emission unit 111 (3, 1, 2) is turned ON and the other emission units 111 are turned OFF. Then the optical sensor 113 (2, 1) is selected as the optical sensor for adjustment, and the detected value by the optical sensor 113 (2, 1) is outputted to the microcomputer 125. Here as well Rd becomes 3.16 at the position of the optical sensor 113 (2, 1).

In the thirty-fifth processing, the emission unit 111 (3, 1, 3) is turned ON and the other emission units 111 are turned OFF. Then the optical sensor 113 (2, 1) is selected as the optical sensor for adjustment, and the detected value by the optical sensor 113 (2, 1) is outputted to the microcomputer 125. Here Rd becomes 5.10 at the position of the optical sensor 113 (2, 1).

In the thirty-sixth processing as well, Rd becomes 5.10 at the position of the optical sensor for adjustment. Hereafter processing operations up to the forty-eighth processing are executed in the same manner. In this case, Rd becomes either 5.10 or 3.16 at the position of the optical sensor for adjustment.

Figure 30:
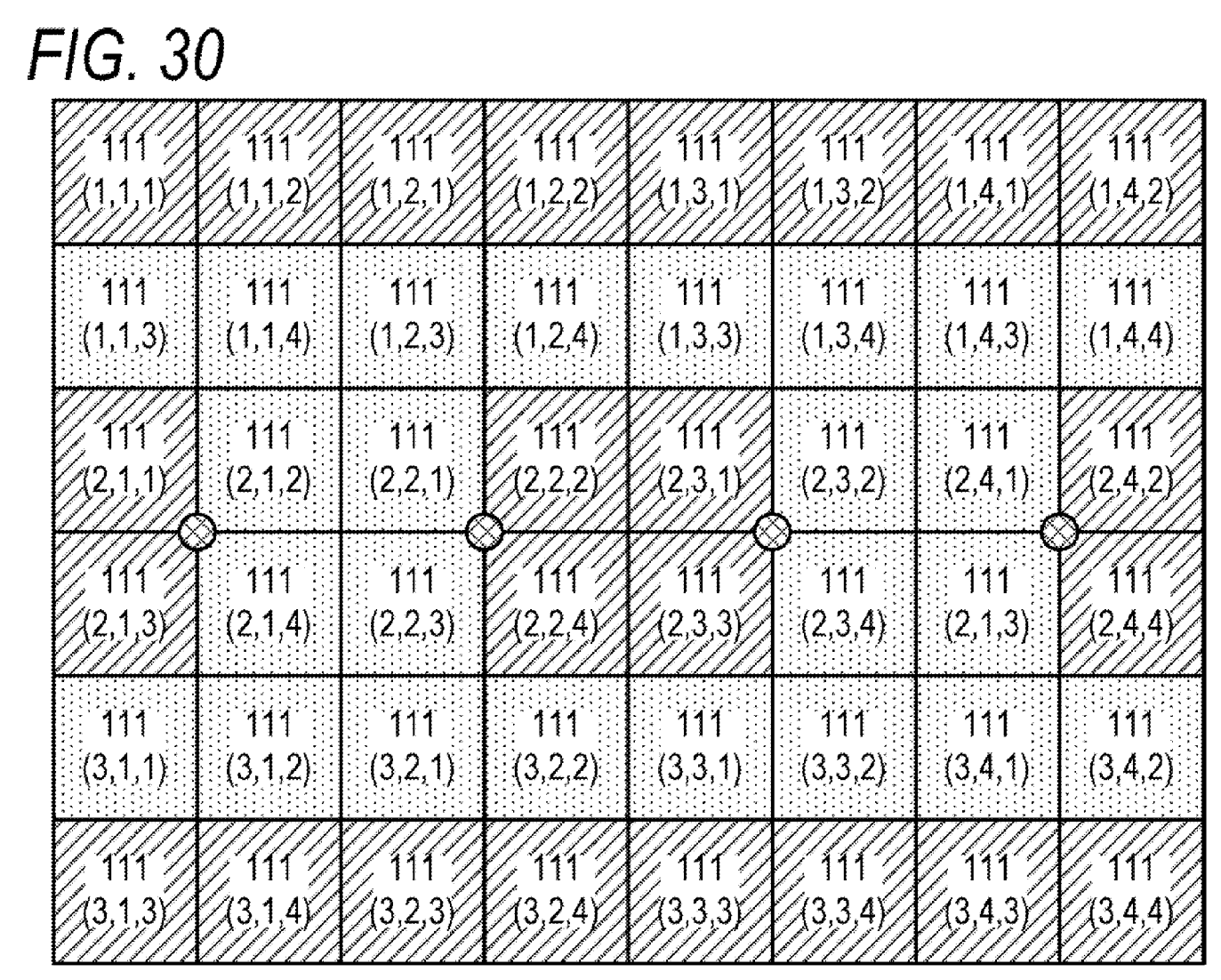

FIG. 30 is a schematic diagram depicting an example of a positional relationship between the emission unit 111 and the optical sensor for adjustment according to the correspondence tables in FIG. 28 and FIG. 29. In FIG. 30, the emission unit 111 (second emission unit) located where the optical sensor for adjustment is located at a position of Rd=5.10 is filled with a shaded pattern. For example, the emission unit 111 (1, 1, 1) and the emission unit 111 (1, 1, 2) are the second emission units. In FIG. 30, an emission unit 111 (third emission unit) located where the optical sensor for adjustment is located at a position of Rd=3.16 is filled with a dot pattern. For example, the emission unit 111 (1, 1, 3) and the emission unit 111 (1, 1, 4) are the third emission units.

As FIG. 30 shows, the second emission unit and the third emission unit are adjacent to each other. Therefore even if the configuration in FIG. 27 is used, an error of the emission brightness among the emission units 111 is cancelled out, whereby an error of the brightness on the front face of the optical sheet, when all the emission units are turned ON at the adjusted emission brightness, can be decreased.

In FIG. 19A and FIG. 19B, one optical sensor 113 is disposed for the four emission units 111. Now a case of disposing one optical sensor 113 for six emission units 111 will be decreased.

FIG. 31A is a schematic diagram depicting an example of a configuration of an LED substrate 110 according to this embodiment. In FIG. 31A, the LED substrate 110 has a total of six emission units 111 (2 rows×3 columns). Four LED chips 112 are disposed at equal intervals in each emission unit 111. A backlight apparatus according to this embodiment can adjust the emission brightness for each emission unit 111. One optical sensor 113 is disposed on each LED substrate 110. The optical sensor 113 is disposed at the center of the six emission units 111 (that is, the center of the LED substrate 110).

FIG. 31B is a schematic diagram depicting an example of the arrangement of the LED substrate 110, the emission unit 111 and the optical sensor 113 when viewed from the front direction (color liquid crystal panel 105 side). The LED substrate 110 (1, 2) adjoins on the right side of the LED substrate 110 (1, 1) which is disposed on the upper left corner, and the LED substrate 110 (2, 1) adjoins under the LED substrate 110 (1, 1). The LED substrate 110 (2, 2) adjoins on the right side of the LED substrate 110 (2, 1). As described above, the light source substrate 101 has a total of four LED substrates 110 (2 rows×2 columns) (a total of 24 emission units 111 arranged in 4 rows×6 columns).

The LED substrate 110 (1, 1) has the emission unit 111 (1, 1, 1), the emission unit 111 (1, 1, 2), the emission unit 111 (1, 1, 3), the emission unit 111 (1, 1, 4), the emission unit 111 (1, 1, 5) and the emission unit 111 (1, 1, 6). The optical sensor 113 (1, 1) is disposed on the LED substrate 110 (1, 1). This is the same for the other LED substrates.

FIG. 31C is a cross-sectional view depicting an example of the positional relationship between the LED substrate 110 and the optical sheet 106. Each LED chip 112 is disposed at equal intervals. The interval of the LED chips 112 is regarded as the LED pitch 501. The optical sheet 106 is disposed parallel with the LED substrate 110. The distance between the optical sheet 106 and the LED substrate 110 is regarded as the diffusion distance 500. Here it is assumed that the diffusion distance 500 is 1.5 times the LED pitch 501. If the diffusion distance 500 is the same as or longer than the LED pitch 501, then the brightness unevenness after transmitting through the optical sheet 106 can be more sufficiently reduced.

FIG. 32 is a correspondence table showing an example of the correspondence relationship of the processing sequence, an emission unit 111 and an optical sensor for adjustment determined for a plurality of emission units 111 (correspondence table in the case of the configuration in FIG. 31B). Then the processing described in Embodiment 1 (processing of acquiring a detected value and outputting the value to the microcomputer 125) is executed 24 times, which is the same number as the number of emission units 111. In FIG. 32, only 2 LED substrates 110 (1, 1) and 110 (1, 2) are illustrated for simplification. The correspondence relationship of an emission unit 111 and an optical sensor for adjustment in the LED substrates 110 (2, 1) and 110 (2, 2) is the same as the case of the LED substrates 110 (1, 1) and 110 (1, 2).

In the first processing, an emission unit 111 (1, 1, 1) is turned ON and the other emission units 111 are turned OFF. Then an optical sensor 113 (1, 2) is selected as the optical sensor for adjustment, and the detected value of the optical sensor 113 (1, 2) is outputted to the microcomputer 125.

Figure 33A:
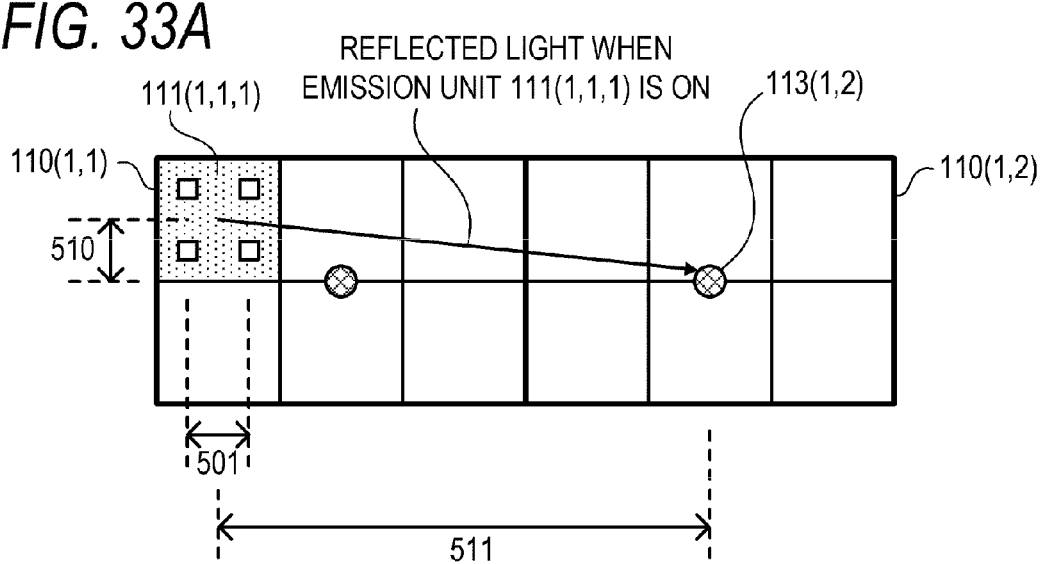
FIG. 33A to FIG. 33C are diagrams depicting an example of a positional relationship between an emission unit and an optical sensor for adjustment according to Embodiment 3.

FIG. 33A is a schematic diagram depicting a positional relationship between the emission unit 111 (1, 1, 1) and the optical sensor 113 (1, 2) when viewed from the front direction (color liquid crystal panel 105 side). The optical sensor 113 (1, 2), which is located relatively distant from the emission unit 111 (1, 1, 1) is used instead of the optical sensor 113 closest to the emission unit 111 (1, 1, 1). Since the vertical distance 510 is the same as the LED pitch 501, and the horizontal distance 511 is 8 times the LED pitch 501, the distance between the emission center of the emission unit 111 (1, 1, 1) and the optical sensor 113 (1, 2) is 8.06 times the LED pitch 501 based on the Pythagorean Theorem. The diffusion distance 500 is 1.5 times the LED pitch 501, so the distance between the emission center of the emission unit 111 (1, 1, 1) and the optical sensor 113 (1, 2) is 5.37 times the diffusion distance 500 (Rd=5.37).

As FIG. 32 shows, in the second processing, the emission unit 111 (1, 1, 2) is turned ON and the other emission units 111 are turned OFF. Then the optical sensor 113 (1, 2) is selected as the optical sensor for adjustment, and the detected value by the optical sensor 113 (1, 2) is outputted to the microcomputer 125.

Figure 33B:
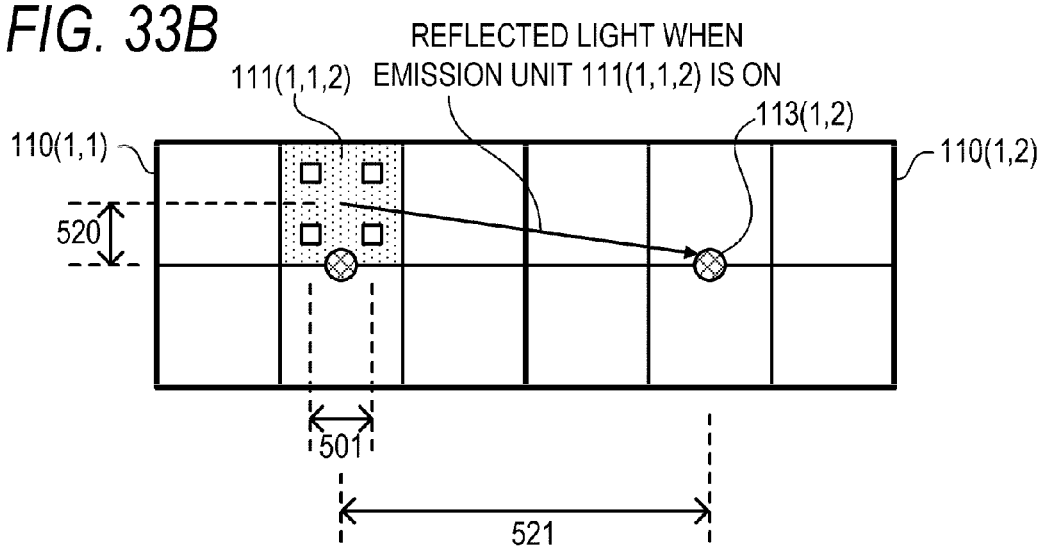

FIG. 33B is a schematic diagram depicting a positional relationship between the emission unit 111 (1, 1, 2) and the optical sensor 113 (1, 2) when viewed from the front direction (color liquid crystal panel 105 side). The optical sensor 113 (1, 2), which is located relatively distant from the emission unit 111 (1, 1, 2), is used instead of the optical sensor 113 closest to the emission unit 111 (1, 1, 2). Since the vertical distance 520 is the same as the LED pitch 501, and the horizontal distance 521 is 6 times the LED pitch 501, the distance between the emission center of the emission unit 111 (1, 1, 2) and the optical sensor 113 (1, 2) is 6.08 times the LED pitch 501 based on the Pythagorean Theorem. The diffusion distance 500 is 1.5 times the LED pitch 501, so the distance between the emission center of the emission unit 111 (1, 1, 2) and the optical sensor 113 (1, 2) is 4.06 times the diffusion distance 500 (Rd=4.06).

As FIG. 32 shows, in the third processing, the emission unit 111 (1, 1, 3) is turned ON and the other emission 111 units are turned OFF. Then the optical sensor 113 (1, 2) is selected as the optical sensor for adjustment, and the detected value by the optical sensor 113 (1, 2) is outputted to the microcomputer 125.

Figure 33C:
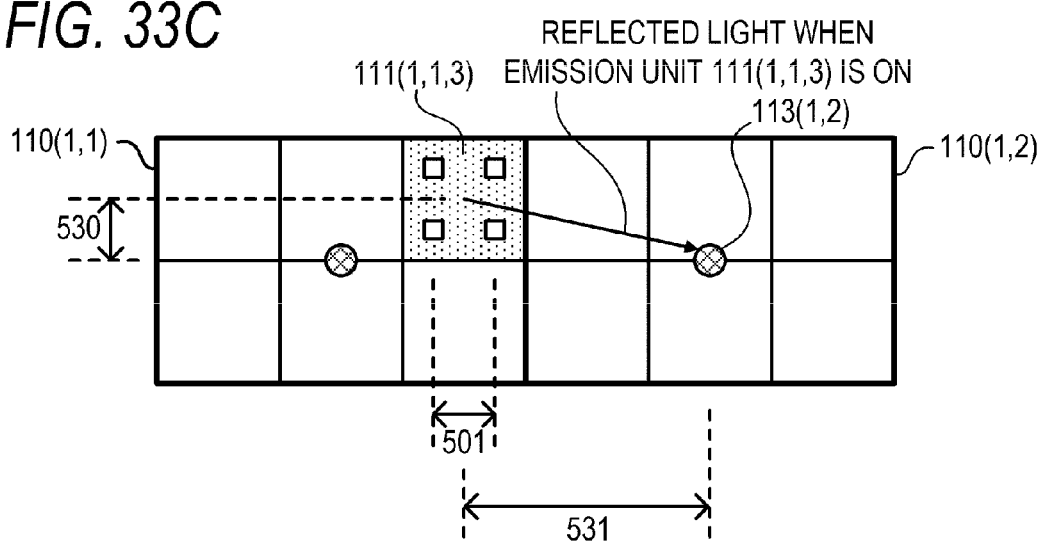

FIG. 33C is a schematic diagram depicting a positional relationship between the emission unit 111 (1, 1, 3) and the optical sensor 113 (1, 2) when viewed from the front direction (color liquid crystal panel 105 side). The optical sensor 113 (1, 2), which is located relatively distant from the emission unit 111 (1, 1, 3) is used instead of the optical sensor 113 closest to the emission unit 111 (1, 1, 3). Since the vertical distance 530 is the same as the LED pitch 501 and the horizontal distance 531 is 4 times the LED pitch 501, the distance between the emission center of the emission unit 111 (1, 1, 3) and the optical sensor 113 (1, 2) is 4.12 times the LED pitch 501 based on the Pythagorean Theorem. The diffusion distance 500 is 1.5 times the LED pitch 501, so the distance between the emission center of the emission unit 111 (1, 1, 3) and the optical sensor 113 (1, 2) is 2.75 times the diffusion distance 500 (Rd=2.75).

The fourth and later processing operations shown in the correspondence table in FIG. 32 are executed in the same manner. In the fourth and later processing operations, the distance between the emission center of the processing target emission unit 111 and the optical sensor for adjustment is 5.37 times, 4.06 times or 2.75 times the diffusion distance 500.

As described above, a change of brightness due to deflection of the optical sheet substantially becomes zero at a position on the back face of the optical sheet facing the position where Rd is approximately 4.

In this example, a plurality of emission units includes the first emission unit, the second emission unit and the third emission unit. The optical sensor detection unit that is used for adjusting the emission brightness of the first emission unit is located to a position facing the position on the back face of the optical sheet where the change amount of brightness, due to deflection of the optical sheet when only the first emission unit is turned ON, is substantially zero. The detection unit that is used for adjusting the emission brightness of the second emission unit and the detection unit that is used for adjusting the emission brightness of the third emission unit are as described above.

Figures 34, 35:
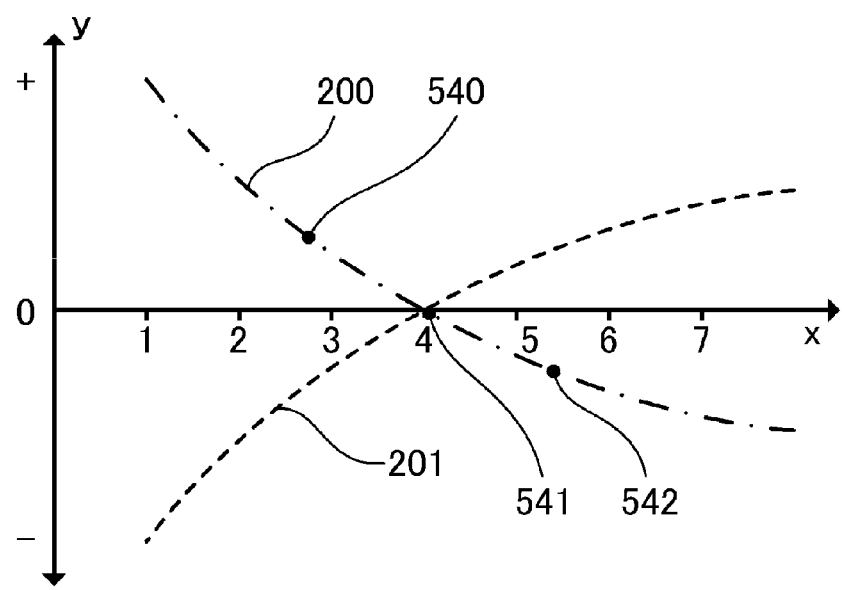
FIG. 34 is a diagram depicting an example of a positional relationship between the emission unit and the optical sensor for adjustment according to Embodiment 3.
FIG. 35 is a diagram depicting an example of the relationship between the change amount of brightness due to deflection of the optical sheet and Rd.

FIG. 34 is a schematic diagram depicting an example of a positional relationship between the emission unit 111 and the optical sensor for adjustment. In FIG. 34, an emission unit (second emission unit) at a position where the optical sensor for adjustment is located at a position of Rd=5.37 is filled with a shaded pattern. For example, the emission unit 111 (1, 1, 1) and the emission unit 111 (1, 2, 3) are the second emission units. An emission unit (third emission unit) located where the optical sensor for adjustment is located at a position of Rd=2.75 is filled with a dot pattern. For example, an emission unit 111 (1, 1, 3) and the emission unit 111 (1, 2, 1) are the third emission units. An emission unit (first emission unit) at a position where the optical sensor for adjustment is located at a position of Rd=4.06 is not filled with a pattern. For example, the emission unit 111 (1, 1, 2) and the emission unit 111 (1, 2, 2) are the first emission units. In this example, the first emission unit, the second emission unit and the third emission unit are dispersed so as to cancel out the errors of the adjusted emission brightness due to the change of brightness distribution on the back face of the optical sheet. In concrete terms, the first emission unit to the third emission unit are repeatedly disposed in the row direction in a sequence of the second emission unit, the first emission unit and the third emission unit. In other words, the second emission unit and the third emission unit are adjacent to each other via the first emission unit.

FIG. 35 shows an example of a relationship between the change amount of the brightness on the back face of the optical sheet 106 and Rd. The x axis in FIG. 35 indicates Rd. The y axis in FIG. 35 indicates the change amount of brightness (brightness on the back face of the optical sheet) generated by deflection of the optical sheet, in other words, a detection error of the optical sensor. The curve 200 shows a detection error when the optical sheet 106 is deflected in the minus direction. The curve 201 shows a detection error when the optical sheet 106 is deflected in the plus direction. The position facing a position where Rd is approximately 4 is a zero cross point.

If the optical sheet 106 is deflected in the minus direction, an error in the plus direction (an error of which absolute value is small) is generated in a position facing a position of Rd=2.75 as indicated by the point 540. An error substantially becomes zero at a position facing a position of Rd=4.06, as indicated by the point 541. An error in the minus direction (an error of which absolute value is small) is generated at a position facing a position of Rd=5.37, as indicated by the point 542.

In this example, the first to third emission units are disposed in dispersed locations, therefore an error of the emission brightness of each emission unit due to a detection error by the optical sensor for adjustment is cancelled out. For example, an error of the emission brightness due to a detection error generated at a position of Rd=2.75 and an error of the emission brightness due to a detection error generated at a position of Rd=5.37 are cancelled out. As a result, an error of the brightness (brightness on the front face of the optical sheet) when all the emission units are turned ON at the adjusted emission brightness can be a small value.

As described above, according to this example, the number of optical sensors can be decreased, and an error of the brightness on the front face of the optical sheet when all the emission units are turned ON at the adjusted emission brightness can be decreased.

One light source apparatus may be configured by combining a plurality of different types of light source apparatuses described in each example.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-185538, filed on Aug. 24, 2012, which is hereby incorporated by reference herein in its entirety.

What is claimed is:

1. A light source apparatus, comprising:
a light source board on which one or more emission units are located;
an optical sheet configured to reflect a part of light from the emission unit; and
a detection unit configured to detect light reflected by the optical sheet and to output a detection value, wherein
the detection unit is located in a position where a ratio of change amount in a detection value when one emission unit is turned ON in a case where the optical sheet is deformed with respect to a detection value when the one emission unit is turned ON in a case where the optical sheet is not deformed is approximately 3% or less, and
the light from the emission unit has a directivity of which intensity distribution is substantially a Lambertian distribution.

2. The light source apparatus according to claim 1, further comprising:
an adjustment unit configured to adjust the emission brightness of the one emission unit based on the detection value.

3. The light source apparatus according to claim 1, wherein
a plurality of emission units are located on the light source board, and the light source apparatus comprises a plurality of detection units.

4. A light source apparatus, comprising:
a light source board on which one or more emission units are located;
an optical sheet configured to reflect a part of light from the emission unit; and
a detection unit configured to detect light reflected by the optical sheet and to output a detection value, wherein
the detection unit, which detects the reflected light when one emission unit is turned ON, is located in a position that is away from the emission center of the one emission unit by a distance 2.75 to 5.37 times a distance between the one emission unit and the optical sheet.

5. The light source apparatus according to claim 4, wherein
the detection unit is located in a position that is away from the emission center of the one emission unit by a distance 4 times a distance between the one emission unit and the optical sheet.

6. The light source apparatus according to claim 4, wherein a plurality of light sources are located in the emission unit.

7. The light source apparatus according to claim 4, wherein
a plurality of emission units are located on the light source board, the light source apparatus comprises a plurality of detection units, and
the detection unit, which is located in a position that is away from the emission center of the one emission unit by a distance 2.75 to 5.37 times a distance between the one emission unit and the optical sheet, out of the plurality of detection units, is not a detection unit closest to the one emission unit.

8. The light source apparatus according to claim 7, wherein a distance from the emission center of the one emission unit to the detection unit closest to the one emission unit is shorter than a distance 2.75 times a distance between the one emission unit and the optical sheet.

9. The light source apparatus according to claim 4, further comprising:
an adjustment unit configured to adjust the emission brightness of the one emission unit based on a detection value obtained by the detection unit.

10. A display apparatus comprising:
the light source apparatus according to claim 4; and
a liquid crystal panel configured to receive from a back face side thereof light from the light source apparatus.

11. A light source apparatus, comprising:
a plurality of emission units;
an optical sheet configured to reflect a part of light from each of the plurality of emission units;
a plurality of detection units each of which is configured to detect light reflected by the optical sheet when a target emission unit is turned ON; and
an adjustment unit configured to adjust the emission brightness of the target emission unit based on a detection value obtained by a detection unit selected out of the plurality of detection units, wherein
the adjustment unit selects a detection unit which is located in a position where the change amount of the detection value due to deformation of the optical sheet is a predetermined value or less, and does not select a detection unit which is located in a position where the change amount of the detection value due to deformation of the optical sheet is more than the predetermined value.

12. The light source apparatus according to claim 11, wherein
the selected detection unit is not a detection unit closest to the target emission unit.

13. The light source apparatus according to claim 12, wherein the change amount of the detection value obtained by the detection unit closest to the one emission unit due to the deformation of the optical sheet is more than the predetermined value.

14. The light source apparatus according to claim 11, wherein the adjustment unit selects a detection unit by referring to a correspondence table in which a correspondence relationship between the plurality of emission units and the plurality of detection units is predetermined.

15. The light source apparatus according to claim 11, wherein a distance between the emission center of an emission unit that is close to an edge of a light source board on which the plurality of emission units are located and a detection unit that is used to adjust the emission brightness of the emission unit is longer than a distance between the emission center of an emission unit that is not close to the edge of the light source board and a detection unit that is used to adjust the emission brightness of the emission unit.

16. The light source apparatus according to claim 11, wherein the plurality of emission units includes a first emission unit and a second emission unit,
a detection unit that is used to adjust the emission brightness of the first emission unit is located in a position that is more distant from the first emission unit than a position facing a position on the surface of the optical sheet where the change amount of the brightness due to deformation of the optical sheet when only the first emission unit is turned ON is approximately zero,
a detection unit that is used to adjust the emission brightness of the second emission unit is located in a position closer to the second emission unit than a position facing a position on the surface of the optical sheet where the change amount of the brightness due to deformation of the optical sheet when only the second emission unit is turned ON is approximately zero, and the first emission unit and the second emission unit are
located in dispersed positions so that an error of the
adjusted emission brightness due to the change of the
brightness distribution is cancelled out.

17. The light source apparatus according to claim 11, wherein
the plurality of emission units are located on a light source board which is approximately parallel with the optical sheet.

18. The light source apparatus according to claim 11, wherein a plurality of light sources are located in the emission unit.

19. A display apparatus comprising:
the light source apparatus according to claim 11; and
a liquid crystal panel configured to receive from a back face side thereof light from the light source apparatus.

20. The light source apparatus according to claim 11, wherein the deformation of the optical sheet is caused by a thermal factor.

21. The light source apparatus according to claim 11, wherein
the adjustment unit selects the detection unit which is located in a position where a ratio of change amount in a detection value in a case where the optical sheet is deformed with respect to a detection value in a case where the optical sheet is not deformed is approximately 3% or less.

22. The light source apparatus according to claim 11, wherein the plurality of emission units are turned ON one by one, and the adjustment unit selects a detection unit corresponding to an emission unit which is turned ON.

23. A method for controlling a light source apparatus having a plurality of emission units, an optical sheet configured to reflect a part of light from each of the plurality of emission units, and a plurality of detection units each of which is configured to detect light reflected by the optical sheet,
the method comprising:
turning the plurality of emission units ON one by one; and
detecting light reflected by the optical sheet when a target emission unit is turned ON in the turning by selecting a detection unit that is located in a position where an amount of change in a detection value due to deformation of the optical sheet is a predetermined value or less, out of the plurality of detection units; and
adjusting the emission brightness of the target emission unit based on the detection value obtained by the detection unit selected in the detecting, wherein
a detection unit that is located in a position where an amount of change in a detection value due to deformation of the optical sheet is more than the predetermined value is not selected in the detecting.

24. A method for controlling a light source apparatus having a light source board on which a plurality of emission units are located, an optical sheet configured to reflect a part of light from each of the plurality of emission units, and a plurality of detection units each of which is configured to detect light reflected by the optical sheet,
the method comprising the steps of:
turning the plurality of emission units ON one by one; and
detecting light reflected by the optical sheet by using the detection unit when one emission unit is turned ON in the turning, wherein
the detection unit, which detects the reflected light when the one emission unit is turned ON, is located in a position that is away from the emission center of the one emission unit by a distance 2.75 to 5.37 times a distance between the one emission unit and the optical sheet.

25. A light source apparatus, comprising:
a plurality of emission units;
an optical sheet configured to reflect a part of light from each of the plurality of emission units;
a plurality of detection units each of which is configured to detect light reflected by the optical sheet when a target emission unit is turned ON; and
an adjustment unit configured to adjust the emission brightness of the target emission unit based on a detection value obtained by a detection unit selected out of the plurality of detection units, wherein
the adjustment unit selects a detection unit which is located in a position that is away from the emission center of the target emission unit by a distance 2.75 to 5.37 times a distance between the target emission unit and the optical sheet.

26. The light source apparatus according to claim 25, wherein the adjustment unit does not select a detection unit which is located in a position that is away from the emission center of the target emission unit by a distance less than 2.75 times or more than 5.37 times a distance between the target emission unit and the optical sheet.

27. The light source apparatus according to claim 25, wherein the plurality of emission units are turned ON one by one, and the adjustment unit selects a detection unit corresponding to an emission unit which is turned ON.

28. A display apparatus comprising:
the light source apparatus according to claim 25; and
a liquid crystal panel configured to receive from a back face side thereof light from the light source apparatus.

29. The light source apparatus according to claim 25, wherein the detection unit, which is located in the position that is away from the emission center of the target emission unit by the distance 2.75 to 5.37 times the distance between the target emission unit and the optical sheet, is not a detection unit which is closest to the target emission unit.

30. The light source apparatus according to claim 25, wherein
the plurality of emission units are located on a light source board which is approximately parallel with the optical sheet.

31. A light source apparatus, comprising:
a plurality of emission units;
an optical sheet configured to reflect a part of light from each of the plurality of emission units;
a plurality of detection units each of which is configured to detect light reflected by the optical sheet when a target emission unit is turned ON; and
an adjustment unit configured to adjust the emission brightness of the target emission unit based on a detection value obtained by a detection unit selected out of the plurality of detection units, wherein
the adjustment unit selects a detection unit other than a detection unit which is closest to the target emission unit in consideration of deformation of the optical sheet.

32. The light source apparatus according to claim 31, wherein the plurality of emission units are turned ON one by one, and
the adjustment unit selects a detection unit corresponding to an emission unit which is turned ON.

33. The light source apparatus according to claim 31, wherein the deformation of the optical sheet is caused by a thermal factor.

34. A display apparatus comprising:
the light source apparatus according to claim 31; and
a liquid crystal panel configured to receive from a back face side thereof light from the light source apparatus.

35. The light source apparatus according to claim 31, wherein the adjustment unit selects a detection unit which is located in a position that is away from the emission center of the target emission unit by a distance 2.75 to 5.37 times a distance between the target emission unit and the optical sheet.

36. The light source apparatus according to claim 31, wherein the adjustment unit selects a detection unit other than a detection unit which is closest to the target emission unit to reduce the detection error due to the deformation of the optical sheet.

37. The light source apparatus according to claim 31, wherein
the adjustment unit selects a detection unit of which distance from the emission center of the target emission unit is equal to or longer than a distance 2.75 times a distance between the target emission unit and the optical sheet.

38. The light source apparatus according to claim 31, wherein the adjustment unit selects a detection unit which is located in a position where a ratio of the change amount of the detection value due to deformation of the optical sheet is 3% or less.

39. The light source apparatus according to claim 31, wherein
the plurality of emission units are located on a light source board which is approximately parallel with the optical sheet.

40. A method for controlling a light source apparatus having a plurality of emission units, an optical sheet configured to reflect a part of light from each of the plurality of emission units, and a plurality of detection units each of which is configured to detect light reflected by the optical sheet,
the method comprising the steps of:
turning the plurality of emission units ON one by one;
detecting light reflected by the optical sheet when a target emission unit is turned ON in the turning, by using a detection unit selected out of the plurality of detection units; and
adjusting the emission brightness of the target emission unit based on a detection value obtained by the detection unit selected in the detecting, wherein
a detection unit, which is located in a position that is away from the emission center of the target emission unit by a distance 2.75 to 5.37 times a distance between the target emission unit and the optical sheet, is selected in the detecting.

41. A method for controlling a light source apparatus having a plurality of emission units, an optical sheet configured to reflect a part of light from each of the plurality of emission units, and a plurality of detection units each of which is configured to detect light reflected by the optical sheet,
the method comprising the steps of:
turning the plurality of emission units ON one by one;
detecting light reflected by the optical sheet when a target emission unit is turned ON in the turning, by using a detection unit selected out of the plurality of detection units; and
adjusting the emission brightness of the target emission unit based on a detection value obtained by the detection unit selected in the detecting, wherein in the detecting, a detection unit other than a detection unit which is closest to the target emission unit is selected in consideration of deformation of the optical sheet.

42. A light source apparatus, comprising:
a plurality of emission units;
an optical sheet configured to reflect a part of light from each of the plurality of emission units;
a plurality of detection units each of which is configured to detect light reflected by the optical sheet when a target emission unit is turned ON; and
an adjustment unit configured to adjust the emission brightness of the target emission unit based on a detection value obtained by a detection unit selected out of the plurality of detection units, wherein
the adjustment unit selects a detection unit which is located close to a position where the change amount of the brightness on the surface of the optical sheet due to deformation of the optical sheet when the target emission unit is turned ON is approximately zero.

43. The light source apparatus according to claim 42, wherein
the detection unit selected by the adjustment unit is not a detection unit which is closest to the target emission unit.

44. The light source apparatus according to claim 42, wherein
the detection unit selected by the adjustment unit is located in a position that is away from the emission center of the target emission unit by a distance 2.75 to 5.37 times a distance between the target emission unit and the optical sheet.

45. The light source apparatus according to claim 42, wherein
the plurality of emission units are turned ON one by one, and
the adjustment unit selects a detection unit corresponding to an emission unit which is turned ON.

46. The light source apparatus according to claim 42, wherein the deformation of the optical sheet is caused by a thermal factor.

47. A display apparatus comprising:
the light source apparatus according to claim 42; and
a liquid crystal panel configured to receive from a back face side thereof light from the light source apparatus.

48. The light source apparatus according to claim 42, wherein
the adjustment unit selects a detection unit which is located closest to the position where the change amount of the brightness on the surface of the optical sheet due to deformation of the optical sheet when the target emission unit is turned ON is approximately zero.

49. The light source apparatus according to claim 42, wherein
the plurality of emission units are located on a light source board which is approximately parallel with the optical sheet.

50. A method for controlling a light source apparatus having plurality of emission units, an optical sheet configured to reflect a part of light from each of the plurality of emission units, and a plurality of detection units each of which is configured to detect light reflected by the optical sheet, the method comprising:

turning the plurality of emission units ON one by one;

detecting light reflected by the optical sheet when the target emission unit is turned ON in the turning, by using a detection unit selected out of the plurality of detection units; and adjusting the emission brightness of the target emission unit based on a detection value obtained by the detection unit selected in the detecting, wherein in the detecting, a detection unit which is located close to a position where the change amount of the brightness on the surface of the optical sheet due to deformation of the optical sheet when the target emission unit is turned ON is approximately zero, is selected.

51. A light source apparatus, comprising:

a plurality of emission units;

an optical sheet configured to reflect a part of light from each of the plurality of emission units;

a plurality of detection units each of which is configured to detect light reflected by the optical sheet when a target emission unit is turned ON; and an adjustment unit configured to adjust the emission brightness of the target emission unit based on a detection value obtained by a detection unit selected out of the plurality of detection units, wherein the adjustment unit selects a detection unit other than a detection unit which causes a detection error more than a predetermined value due to deformation of the optical sheet.

52. A light source apparatus, comprising:

a plurality of emission units;

an optical sheet configured to reflect a part of light from each of the plurality of emission units;

a plurality of detection units each of which is configured to detect light reflected by the optical sheet when a target emission unit is turned ON; and an adjustment unit configured to adjust the emission brightness of the target emission unit based on a detection value obtained by a detection unit selected out of the plurality of detection units, wherein the adjustment unit selects a detection unit which is located close to a position where the change amount of a detection value due to deformation of the optical sheet when the target emission unit is turned ON is approximately zero.

\* \* \* \* \*